(12) United States Patent
Templeton et al.

(10) Patent No.: US 9,864,424 B1
(45) Date of Patent: Jan. 9, 2018

(54) POWER MANAGEMENT OF POINT-OF-SALE COMPONENT

(71) Applicant: Square, Inc., San Francisco, CA (US)

(72) Inventors: Thomas Templeton, Oakland, CA (US); David Terra, San Francisco, CA (US); Michael White, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/390,247

(22) Filed: Dec. 23, 2016

(51) Int. Cl.
*G06F 1/32* (2006.01)
*G07G 1/12* (2006.01)

(52) U.S. Cl.
CPC ............ *G06F 1/3228* (2013.01); *G07G 1/12* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/01
See application file for complete search history.

(56) References Cited

U.S. PATENT DOCUMENTS

| | | | | |
|---|---|---|---|---|
| 2003/0009705 A1* | 1/2003 | Thelander | ............. | G06F 1/3203 713/340 |
| 2007/0079156 A1* | 4/2007 | Fujimoto | .............. | G06F 1/3221 713/300 |
| 2009/0106571 A1* | 4/2009 | Low | ....................... | G06F 9/4856 713/310 |
| 2010/0070785 A1* | 3/2010 | Fallin | ................... | G08B 13/248 713/320 |
| 2012/0016760 A1* | 1/2012 | Lee | ........................ | G06Q 20/20 705/23 |
| 2013/0117139 A1* | 5/2013 | DiMattina | .............. | G06Q 20/20 705/16 |
| 2013/0256414 A1* | 10/2013 | Liu | ........................ | G06K 7/082 235/449 |
| 2014/0149240 A1* | 5/2014 | Ansel | ................ | G06F 17/30705 705/21 |
| 2014/0157016 A1* | 6/2014 | Rajagopal | ............. | G06F 1/3234 713/320 |
| 2014/0372781 A1* | 12/2014 | Klappert | ................ | H04N 7/163 713/323 |
| 2015/0127182 A1* | 5/2015 | Inagi | ........................ | G05F 1/66 700/295 |

* cited by examiner

*Primary Examiner* — Zahid Choudhury
(74) *Attorney, Agent, or Firm* — Lee & Hayes, PLLC

(57) ABSTRACT

Techniques for generating schedule(s) specific to a merchant for managing power states of component(s) of a point-of-sale (POS) system of the merchant are described. Transaction data associated with transactions involving the merchant may be received from a POS application of the POS system. Based at least partly on the transaction data, a schedule for managing the power states of a component, such as a battery-operated payment reader device, may be determined. The schedule may indicate when to change a first power state of the component to a second power state. The schedule may be sent to a POS system. The POS system may use the schedule to manage the power states of a component of the POS system, such as a battery-operated reader device. Additionally, or alternatively, the POS system may determine triggering events and may manage the power states of the component based on the triggering events.

20 Claims, 8 Drawing Sheets

POWER MANAGEMENT OF POINT-OF-SALE COMPONENT

BACKGROUND

Retail transactions such as purchases may be performed with payment instruments such as credit cards or near-field communication (NFC)-enabled smart phones running payment applications. A traditional payment terminal may reside at a fixed location and may have a physical connection to a power source such as an AC outlet. The payment terminal may also be physically connected to a wired communication interface such as a phone line or Ethernet connection. The payment terminal receives payment information such as a credit card number from the payment instrument and communicates with a remote server, such as a payment server, to determine whether the transaction is approved.

Some modernized payment terminals are configured to include one or more battery-operated components. In at least one example, applications running on a mobile device such as smart phone or tablet may provide a user interface to facilitate payment transactions and a communication interface for communicating with the payment server. In another example, a separate payment reader may be used to interface with the payment instrument. The payment reader may be portable and communicate wirelessly with the mobile device. In some instances, the payment reader is battery-operated. That is, in some instances, the payment reader requires charging or replacement batteries.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1:
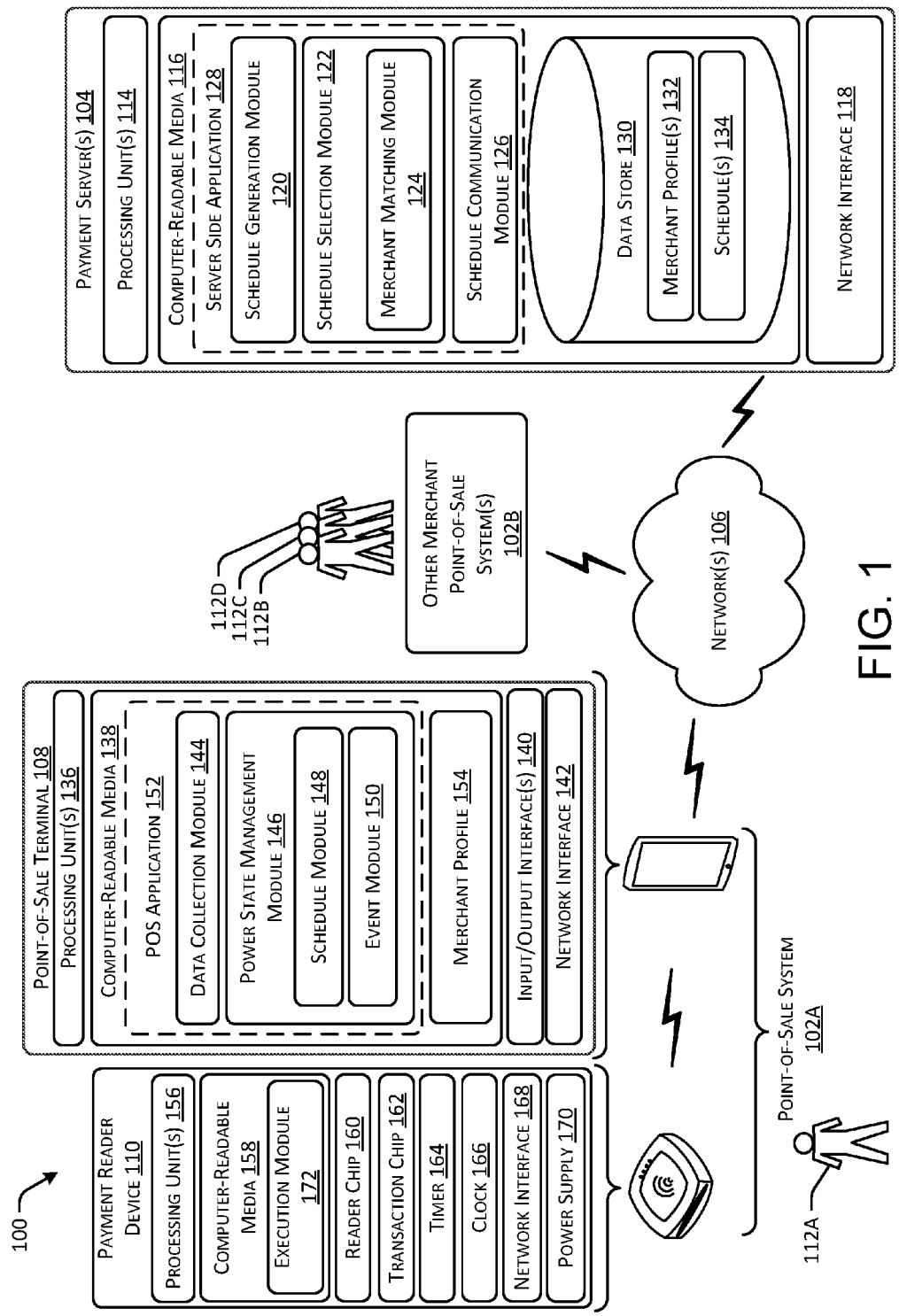
FIG. 1 depicts an illustrative block diagram of a payment system in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A point-of-sale (POS) system may include a POS terminal and a payment reader. The payment reader may interact with payment instruments such as magnetic stripe payment cards, EMV payment cards, and short-range communication payment instruments. The POS terminal may provide a rich user interface, communicate with the payment reader, and also communicate with a payment server. In this manner, the POS terminal and payment reader may collectively process transaction(s) between a merchant and customer(s).

In some examples, component(s) of a POS system may be battery-operated. That is, in some instances, component(s) of a POS system may require charging or replacement batteries. For instance, the payment reader may be a battery-operated device that is wirelessly coupled to the POS terminal. Leaving a payment reader powered on continuously (e.g., all day or for any extended period of time) significantly reduces the useful duration of battery charge available for merchant use. Accordingly, a time-out schedule, which provides a schedule for when the payment reader is to power down, may be useful for extending the useful duration of battery charge available for merchant use (i.e., between charges of the payment reader). A time-out schedule may be generic for all merchants. That is, as a non-limiting example, a time-out schedule may instruct a payment reader associated with a merchant to power down after two hours of inactivity following a transaction. Such a time-out schedule helps extend the useful duration of battery charge available for merchant use. However, after the payment reader is powered down to an off state, it must be manually turned on before it can be used to interface with a payment instrument. Often, payment readers are powered down to an off state at inconvenient times and without knowledge of a merchant. Accordingly, while useful for extending the useful duration of battery charge available for merchant use, a generic time-out schedule can often lead to confusion and frustration caused by a payment reader that appears to be dysfunctional, but is merely in an off state.

Techniques described herein are directed to generating customized schedules for changing power states of components of POS systems. As described herein, a component may correspond to a payment reader that is coupled (e.g., via a wired connection, a wireless connection, etc.) to a POS terminal of the POS system. However, power associated with any component that affects the useful duration of battery charge available for merchant use of a POS system may be managed via schedule(s), as described herein. For the purpose of this discussion, a schedule may indicate when a payment reader of a POS system is to change power states. That is, in an example, a schedule may indicate a time interval (i.e., a predetermined amount of time) following an occurrence of an event (e.g., an interaction, a power-down event, etc.) after which the payment reader is to change power states (e.g., power up, power down, etc.). In some examples, a schedule may include multiple time intervals that correspond to various portions of a day, a week, etc. For instance, a schedule may include a first time interval for managing power states of the payment reader from 12:00 am to 7:00 am, a second time interval for managing power states of the payment reader from 7:01 am to 9:30 am, a third time interval for managing power states of the payment reader from 9:31 am to 12:00 pm, etc. In another example, a schedule may be associated with a particular time or times at which the payment reader is to be in particular power state(s). For instance, a schedule may include a first time at which a payment reader is to be in a high-power state (e.g., powered-on), a second time at which the payment reader is to be in a high-power state (e.g., powered-on), a third time at which the payment reader is to be in a low-power state (e.g., powered-down), etc.

As described above, techniques described herein are directed to generating customized schedules for changing power states of components of POS systems, such as payment readers that are coupled to POS terminals of the POS systems. In at least one example, a payment service may utilize data associated with a POS system of a merchant and/or the merchant to generate a customized schedule for changing power states of a component of the POS system. For instance, transaction data associated with a merchant may indicate that a POS system associated with a merchant processes a large volume of transactions (e.g., more than a predetermined number) between 7:00 am and 9:00 am and again from 1:00 pm to 3:00 pm. The payment service may generate a schedule based on the transaction data, which may direct a payment reader associated with the POS system to power down after a shorter period of inactivity between 9:01 am and 12:59 pm and a longer period of inactivity between 7:00 am and 9:00 am and 1:00 pm and 3:00 pm. As a non-limiting example, between 7:00 am and 9:00 am and 1:00 pm and 3:00 pm, a schedule may direct the payment reader to power down after 20 minutes of inactivity; however, between 9:01 am and 12:59 pm, the schedule may direct a payment reader to power down after 10 minutes of inactivity. As a result, the payment reader is likely to be on when the merchant needs to use the payment reader to process transactions and the payment reader can power down at times when the merchant is not likely to need the payment reader, to extend the useful duration of battery charge available for merchant use.

In some examples, the payment service may classify a merchant based on information about the merchant (e.g., geographic location, items (e.g., goods and/or services) offered for acquisition (e.g., purchase, rent, lease, etc.) by the merchant, category of merchant, etc.) and may access one or more previously generated schedules that are associated with other merchants that are determined to be similar to the merchant (e.g., same or similar geographic location, same or similar items, same or similar category of merchant, etc.). The payment service may provide the one or more previously generated schedules to the POS system associated with the merchant and may generate a customized schedule for the merchant based on data collected over time from the POS system of the merchant. That is, until the payment service generates a customized schedule for the merchant, power states of the payment reader associated with the POS system of the merchant may be managed pursuant to one or more schedules that are used to manage power states of payment readers associated with POS systems of other similarly situated merchants.

In at least one example, a payment service may generate and store schedules, as described herein. The payment service may provide one or more schedules to a POS system associated with a merchant. In an example, a POS application stored on a POS terminal of the POS system may send schedule information based on the schedule to a payment reader of the POS system. In such an example, the payment reader may manage its power states based on the schedule information. That is, the payment reader may adjust its power state (e.g., power up, power down, etc.) based on the schedule information. In an alternative example, the POS application may send signals based on the schedule, or upon an occurrence of a triggering event, to cause the payment reader to change its power state.

As described herein, a payment reader may be associated with different power states. In an example, a payment reader may operate at a high-power state, a low-power state, or an off state. A high-power state may correspond to a state where the payment reader may perform high-level functionalities relating to processing of payment transactions, interfacing with payment instruments, cryptography, other payment-specific functionality, etc. A high-power state may correspond to a powered-on state. The payment reader may power down from a high-power state to a low-power state or an off state. A low-power state may correspond to a state where the payment reader may suspend all high-level functionalities, but may retain its data, receive signals, and perform some low-level functionalities. A low-power state may be similar to a sleep mode. The payment reader may power up from a low-power state to a high-power state or power down from the low-power state to an off state. An off state may correspond to a state where the payment reader may suspend all functionality and may not be able to receive signals. To power up from an off state may require manually turning on the payment reader or a hardware addition to the payment reader that enables the payment reader to power up from an off state. The payment reader may power up from an off state to a low-power state or a high-power state. In at least one example, the off state may be associated with less than a first threshold amount of power, the low-power state may be associated with more than the first threshold amount of power but less than a second threshold amount of power, and the high-power state may be associated with more than the second threshold amount of power.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram of a payment system 100 in accordance with some examples of the present disclosure. In at least one example, the payment system 100 may include POS system(s) (e.g., POS system 102A and other merchant POS system(s) 102B) that are communicatively coupled to one or more payment servers 104 via one or more networks 106. Each POS system may include a POS terminal 108 and a payment reader device 110. While FIG. 1 illustrates a POS terminal 108 and a payment reader device 110 as components of POS system 102A, each of the other merchant POS system(s) 102B may also have a POS terminal and payment reader device.

These components of the payment system 100 facilitate electronic payment transactions between merchants (e.g., merchant 112A, merchant 112B, merchant 112C, merchant 112D, etc.) and customers. In an example, the electronic payment transactions may result from an interaction between a merchant 112A and a customer that takes place between a customer's payment instrument(s) and the merchant's POS system 102A. The customer may have a payment instrument such as a credit card having a magnetic stripe, an EMV chip card, or an electronic device such as a smart phone running a payment application. In at least one example, the electronic device may be configured to transmit data via short-range communication (e.g., near field communication (NFC), Bluetooth®, Bluetooth Low Energy (BLE), Radio-frequency identification (RFID), etc.). The merchant 112A may have a POS system 102A that is capable of processing payment information (e.g., encrypted payment card data and user authentication data) and transaction information (e.g., purchase amount and point-of-purchase information), such as a smart phone or tablet running a payment application.

In at least one example, POS system 102A may communicate with payment server(s) 104 over network(s) 106. The POS system 102A and the payment server(s) 104 communicate payment information and transaction information to determine whether a transaction is authorized. For example, POS system 102 may provide encrypted payment data, user authentication data, purchase amount information, point-of-purchase information, etc. to payment server(s) 104 over network(s) 106. Payment server(s) 104 may determine whether the transaction is authorized and may send an authorization notification to POS system 102A over network(s) 106 to indicate whether the payment transaction is authorized. Payment server(s) 104 may also transmit additional information such as transaction identifiers to POS system 102A. Based on the authentication notification that is received by the POS system 102A from payment server(s) 104, the merchant 112A may indicate to the customer whether the transaction has been approved. In some examples, such as a chip card payment instrument, approval may be indicated at the POS system 102A, for example, at a screen of the POS terminal 108. In other examples, such as a smart phone or watch operating as a short-range communication payment instrument, information about the approved transaction and additional information (e.g., receipts, special offers, coupons, or loyalty program information) may be provided to the short-range communication payment instrument for display at a screen of the smart phone or watch or storage in memory.

The payment server(s) 104 may exchange data with the POS system 102A via network(s) 106, as described above. In an example, the payment server(s) 104 may be associated with a payment service provider. Examples support scenarios where device(s) that may be included in the payment server(s) 104 may include one or more computing devices that operate in a cluster or other configuration to share resources, balance load, increase performance, provide failover support or redundancy, or for other purposes. Device(s) that may be included in the payment server(s) 104 may include any type of computing device having processing units operably connected to computer-readable media such as via a bus, which in some instances may include one or more of a system bus, a data bus, an address bus, a PCI bus, a Mini-PCI bus, and any variety of local, peripheral, and/or independent buses. In at least one configuration, the computer-readable media of the payment server(s) 104 may include module(s) as described above. Alternatively, or in addition, the functionality described herein may be performed, at least in part, by one or more hardware logic components such as accelerators. For example, and without limitation, illustrative types of hardware logic components that may be used include FPGAs, Application-Specific Integrated Circuits (ASICs), Application-Specific Standard Products (ASSPs), System-on-a-Chip Systems (SOCs), Complex Programmable Logic Devices (CPLDs), etc.

In an example, the payment server(s) 104 may include processing unit(s) 114, computer-readable media 116, and a network interface 118. The processing unit(s) 114 of the payment server(s) 104 may execute one or more modules and/or processes to cause the payment server(s) 104 to perform a variety of functions, as set forth above and explained in further detail in the following disclosure. In some examples, the processing unit(s) 114 may include a central processing unit (CPU), a graphics processing unit (GPU), both CPU and GPU, or other processing units or components known in the art. Additionally, each of the processing unit(s) 114 may possess its own local memory, which also may store program modules, program data, and/or one or more operating systems. Depending on the exact configuration and type of the payment server(s) 104, the computer-readable media 116 may include volatile memory (such as RAM), non-volatile memory (such as ROM, flash memory, miniature hard drive, memory card, or the like), or some combination thereof. The payment server(s) 104 may include a network interface 118 for interfacing with the network(s) 106, as described below.

In at least one example, the computer-readable media 116 may include one or more modules for generating schedules based on data associated with the merchant(s) (e.g., merchant 112A, merchant 112B, merchant 112C, merchant 112D, etc.) and determining which schedule(s) to provide to individual ones of the merchant(s) (e.g., merchant 112A, merchant 112B, merchant 112C, merchant 112D, etc.). The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 114) to configure the payment server(s) 104 to execute instructions and to perform operations described herein.

The module(s) may include a schedule generation module 120, a schedule selection module 122, a merchant matching module 124, and a schedule communication module 126. In at least one example, the schedule generation module 120, the schedule selection module 122, the merchant matching module 124, and the schedule communication module 126 may be associated with a server side application 128. Additionally, the computer-readable media 116 may include a data store 130 which may store merchant profile(s) 132 and schedule(s) 134.

The schedule generation module 120 may determine, receive, and/or access data associated with POS system(s) (e.g., POS system 102A, other merchant POS system(s) 102B, etc.) and/or the merchants (e.g., merchant 112A, merchant 112B, merchant 112C, merchant 112D, etc.), and may utilize the data to generate customized schedules for managing power states of component(s) (e.g., POS terminal 108, payment reader device 110, etc.) of POS system(s). The data may include transaction data, charging data, merchant data, etc. In at least one example, a schedule may be customized for a merchant 112A based on data associated with the merchant 112A. In some examples, the schedule generation module 120 may aggregate data from two or more merchants (e.g., merchant 112A, merchant 112B, etc.) and may generate schedule(s) based on the aggregated data. In such examples, the two or more merchants may be associated with a same classification. A classification may be based on a characteristic of a merchant, such as a geographic location of the merchant, an item (e.g., good or service) offered for acquisition by a merchant, a category (e.g., coffee shop, automotive shop, food truck, retail establishment, etc.) associated with a merchant, etc. The two or more merchants may be associated with a cohort. In such examples, a schedule may be customized for the cohort of merchants based on the data associated with the cohort of merchants.

In some examples, the schedule generation module 120 may utilize an algorithm to determine a customized schedule for the merchant 112A or cohort of merchants. In other examples, the schedule generation module 120 may utilize a machine learning algorithm to determine a customized schedule for the merchant 112A or cohort of merchants. Machine learning may refer to one or more programs that learns from the data it receives. For example, a machine learning mechanism may build, modify, or otherwise utilize a data model that is created from example inputs and makes predictions or decisions using the data model. In the current example, the machine learning mechanism may be used to predict a schedule for changing a power state of a payment reader device (e.g., payment reader device 110) based on when a merchant (e.g., merchant 112A) is likely to use the payment reader device (e.g., payment reader device 110) for processing transactions. The data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Additional details associated with generating schedule(s) is described below with reference to FIG. 2.

In some examples, the schedule generation module 120 may receive updated data and may modify schedule(s) based on the updated data. In other examples, the schedule generation module 120 may receive updated data and may generate a new schedule based on the updated data. That is, the schedule generation module 120 may iteratively modify schedule(s) for merchant(s) to ensure that the schedule(s) appropriately manage the power states of payment reader device(s) associated with the merchant(s).

The schedule selection module 122 may select a schedule for a particular merchant (e.g., merchant 112A). In some examples, the schedule selection module 122 may access a merchant profile 132 corresponding to a merchant (e.g., merchant 112A) and may access a previously generated schedule that is mapped to, or otherwise associated with, the merchant profile 132. In such examples, the schedule selection module 122 may access the merchant profile 132 after a lapse of a predetermined time interval, at a predetermined frequency, after a notification of an updated schedule, etc. to determine whether a new schedule has been mapped to, or otherwise associated with, the merchant profile 132 or whether any changes have been made to update an existing schedule. Based at least in part on determining that a new schedule has been mapped to, or otherwise associated with, the merchant profile 132, or that changes have been made to update an existing schedule, the schedule selection module 122 may provide the new schedule or updated schedule to the schedule communication module 126. Additional details associated with determining a schedule for a particular merchant (e.g., merchant 112A) are described below with reference to FIG. 3.

In other examples, a merchant 112A may not have a merchant profile 132. That is, the merchant 112A may be a new merchant that has not registered with the payment service. For instance, the merchant 112A may have recently purchased a payment reader device 110. The merchant 112A may set up the payment reader device 110 and the POS system 102A may send a request to register with the payment service. The schedule selection module 122 may receive the request. The schedule selection module 122 may determine whether any of the merchant profile(s) 132 correspond to the merchant 112A. Based at least in part on determining that the none of the merchant profile(s) 132 correspond to the merchant 112A, the schedule selection module 122 may send the request to the merchant matching module 124.

The merchant matching module 124 may receive the request from the schedule selection module 122. In some examples, the merchant matching module 124 may utilize merchant data associated with the merchant 112A to identify one or more other merchants (e.g., merchant 112B, etc.) that are similar to the merchant 112A. The merchant matching module 124 may provide an indication to the schedule selection module 122 of the one or more other merchants (e.g., merchant 112B, etc.) that are similar to the merchant 112A. The schedule selection module 122 may access schedule(s) associated with the one or more other merchants (e.g., merchant 112B, etc.) to send to the POS system 102A associated with the merchant 112A. Accordingly, the POS system 102A associated with the merchant 102A may control power states associated with components of the POS system 102A based on schedule(s) previously determined for one or more merchants that are similar to the merchant 112A. Additional details associated with determining a schedule for a particular merchant (e.g., merchant 112A) that does not have an existing merchant profile 132 are described below with reference to FIG. 4.

The schedule communication module 126 may send schedule(s) to the POS system 102A. That is, the schedule communication module 126 may receive schedules from the schedule selection module 122 and may send the schedules to the POS system 102A.

The data store 130 may be configured to store data that is accessible, manageable, and updatable. In at least one example, the data store 130 may include merchant profile(s) 132. One or more data items may be mapped to, or otherwise associated with, the merchant profile(s) 132. For instance, data including information about a merchant 112A (e.g., name of the merchant, geographic location of the merchant, types of items offered by the merchant, operating hours of the merchant, a category associated with the merchant, etc.), accounting information associated with the merchant 112A (e.g., bank(s) that the merchant banks with, etc.), transactional information associated with the merchant 112A (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), etc. may be mapped to a merchant profile 132 corresponding to the merchant 112A. In some examples, some of the data including information about a merchant may be stored at the POS terminal 108 in addition to, or as an alternative to, the merchant profile(s) 132. In some examples, a schedule generated by the schedule generation module 120 may be mapped to, or otherwise associated with, one or more merchant profiles 132 corresponding to the one or more merchants to which the schedule corresponds. In additional and/or alternative examples, a schedule generated by the schedule generation module 120 may be mapped to, or otherwise associated with, schedule(s) 134 in the data store 130. In such examples, a schedule may be associated with one or more classifications (e.g., a geographic location of the merchant(s) associated with the schedule, an item offered for acquisition by the merchant(s) associated with the schedule, a category (e.g., coffee shop, automotive shop, food truck, retail establishment, etc.) associated with the merchant(s) associated with the schedule, etc.).

As described above, the payment server(s) 104 may exchange data with the POS system 102A via network(s) 106. In one example, the POS system 102A may include a POS terminal 108 and a payment reader device 110, as described above. In one implementation, the POS terminal 108 may be operated and managed by a merchant (e.g., merchant 112A). Furthermore, the POS terminal 108 may be of a varied hardware and/or software configuration, such that POS terminal 108 may be an Android device or an iOS device. In another example, POS terminal 108 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. The POS terminal 108 may be connected to the payment reader device 110, which is capable of accepting a variety of payment instruments, such as credit cards, debit card, gift cards, short-range communication based payment instruments, and the like.

POS terminal 108 may include processing unit(s) 136, computer-readable media 138, input/output interface(s) 140, and a network interface 142. The processing unit(s) 136 of the POS terminal 108 may execute one or more modules and/or processes to cause the POS terminal 108 to perform a variety of functions, as set forth above and explained in further detail in the following disclosure. In some examples, the processing unit(s) 136 may include a CPU, a GPU, both CPU and GPU, or other processing units or components known in the art. Additionally, each of the processing unit(s) 136 may possess its own local memory, which also may store program modules, program data, and/or one or more operating systems. Depending on the exact configuration and type of the POS terminal 108, the computer-readable media 138 may include volatile memory (such as RAM), non-volatile memory (such as ROM, flash memory, miniature hard drive, memory card, or the like), or some combination thereof. In various examples, the POS terminal 108 may also have input/output interface(s) 140. Examples of input/output interface(s) 140 may include a keyboard, a mouse, a pen, a voice input device, a touch input device, a camera, a sensor, a display, etc. Furthermore, the POS terminal 108 may include a network interface 142 for interfacing with the network(s) 106, as described below.

In at least one example, the computer-readable media 138 may include one or more modules for determining, receiving, and/or accessing data associated with a POS application associated with the POS terminal 108 and/or a merchant 112A, and providing the data to payment server(s) 104. Additionally, the one or more modules may be configured for receiving schedule(s) for managing power states of the payment reader device 110 and sending schedule information to the payment reader device 110. Moreover, the one or more modules may be configured for determining an occurrence of a triggering event and sending a signal to the payment reader device 110 to change a power state of the payment reader device 110 based on the occurrence of the triggering event.

The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 136) to configure the POS terminal to execute instructions and to perform operations described herein.

The module(s) may include a data collection module 144 and a power state management module 146, which may include a schedule module 148 and an event module 150. In at least one example, the data collection module 144 and the power state management module 146, which may include the schedule module 148 and the event module 150, may be associated with a POS application 152. In addition to the module(s), the computer-readable media may include a merchant profile 154 storing data associated with the merchant 112A.

The data collection module 144 may determine, receive, and/or access data associated with the POS system 102A and/or the merchant 112A corresponding to the POS system 102A. The data collection module 144 may receive transaction data, which may include data associated with one or more transactions processed by the POS system 102A. The data associated with the one or more transactions may indicate transactions conducted by a merchant, payment data associated with the transactions, items associated with the transactions, descriptions of items associated with the transactions, itemized and/or total spends of each of the transactions, parties to the transactions, dates, times, and/or locations associated with the transactions, sales associates associated with the transactions, etc. In at least one example, the data collection module 144 may utilize the transaction data to identify patterns and/or trends associated with the one or more transactions. For instance, a pattern and/or trend may indicate the frequency of transactions processed by the POS system 102A associated with the merchant 112A at a particular time or during a particular time interval. Or, a pattern and/or trend may identify a particular time or period of time during which the POS system 102A associated with the merchant 112A processes a volume of transactions above a threshold (e.g., a high number of transactions) or below a threshold (e.g., a low number of transactions). Yet another pattern and/or trend may indicate a frequency associated with using a payment method (e.g., a dip, a tap, a swipe, a cash payment, etc.) at a particular time or during a particular time interval. Furthermore, another pattern and/or trend may identify a particular time or period of time during which the POS system 102A associated with the merchant 112A processes a volume of transactions associated with a particular type of payment method above a threshold (e.g., a high number of swipe transactions) or below a threshold (e.g., a low number of swipe transactions). In some examples, the data collection module 144 may leverage the transaction data to identify patterns and/or trends associated with individual sales associates. For instance, a pattern and/or trend may identify that a first sales associate may utilize the POS system 102A of a merchant 112A to process more transactions than a second sales associate.

Additionally, the data collection module 144 may determine charging data, which may include data indicating times associated with when a payment reader device 110 is connected to a charging device (i.e., charging), how long the payment reader device 110 is charging, etc. In some examples, patterns and/or trends may be determined from the charging data. For instance, a pattern and/or trend may indicate a frequency in which a payment reader device 110 is charged, a time at which a payment reader device 110 is regularly connected to a charging device, an average length of time that a payment reader device 110 is charged, etc.

In some examples, the data collection module 144 may send the transaction data (and data derived from the transaction data), charging data (and data derived from the charging data), etc. to the payment server(s) 104. In additional and/or alternative examples, the data collection module 144 may store at least some of the transaction data (and data derived from the transaction data), charging data (and data derived from the charging data), etc. in the merchant profile 154.

The power state management module 146 may at least partially manage the power states of the payment reader device 110. The power state management module 146 may send schedule information and/or signals to the payment reader device 110 to enable the payment reader device 110 to manage its power states. In at least one example, the schedule module 148 may receive schedule(s) from the payment server(s) 104. The schedule module 148 may send schedule information associated with the schedule(s) to the payment reader device 110 to enable the payment reader device 110 to manage its power states. Additional details associated with sending schedule information to the payment reader device 110 and enabling the payment reader 110 to manage its power states are described below with reference to FIGS. 5-7. In at least one example, the event module 150 may determine an occurrence of a triggering event. Based at least in part on determining an occurrence of a triggering event, the event module 150 may send a signal to the payment reader device 110, instructing the payment reader device 110 to change its power state. Additional details associated with determining triggering event(s) and sending signal(s) to the payment reader device 110 are described below with reference to FIG. 8.

The merchant profile 154 may store merchant data associated with the merchant 112A including, but not limited to, data including information about the merchant 112A (e.g., name of the merchant, geographic location of the merchant, types of items offered for acquisition by the merchant, operating hours of the merchant, a category of the merchant, etc.), accounting information associated with the merchant 112A (e.g., bank(s) that the merchant banks with, etc.), transactional information associated with the merchant 112A (e.g., transactions conducted by the merchant 112A, payment data associated with the transactions, items associated with the transactions, descriptions of items associated with the transactions, itemized and/or total spends of each of the transactions, parties to the transactions, dates, times, and/or locations associated with the transactions, sales associates associated with the transactions, etc.), etc. In at least one example, merchant data may be input by a merchant 112A when the merchant 112A registers with the payment service and creates a merchant profile 154. In some examples, the merchant data may be supplemented by data from the payment server(s) 104.

As described above, the POS terminal 108 may be associated with a payment reader device 110. In one example, the payment reader device 110 may be a wireless communication device that communicates wirelessly with an interactive electronic device such as a POS terminal 108, for example, using Bluetooth®, BLE, NFC, RFID, etc. In another example, the payment reader device 110 may be coupled to an interactive electronic device such as a POS terminal 108, for example, by being insertable into a connector mechanism (e.g., phone jack, headphone jack, or other port) of a smart phone or tablet. That is, in other examples, the payment reader device 110 may be connected to the POS terminal 108 via a wired connection.

The payment reader device 110 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the payment reader device 110 may include hardware implementation, such as slots, magnetic tracks, and rails with one or more sensors or electrical contacts to facilitate detection and acceptance of a payment instrument. That is, the payment reader device 110 may include hardware implementations to enable the payment reader device 110 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader chip-side first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the payment reader device 110 may also include a biometric sensor to receive and process biometric characteristics and process them as payment instruments, given that such biometric characteristics are registered with the payment service system 100 and connected to a financial account with a bank server.

Payment reader device 110 may include processing unit(s) 156, computer-readable media 158, a reader chip 160, a transaction chip 162, a timer 164, a clock 166, a network interface 168, and a power supply 170. The processing unit(s) 156 of the payment reader device 110 may execute one or more modules and/or processes to cause the payment reader device 110 to perform a variety of functions, as set forth above and explained in further detail in the following disclosure. In some examples, the processing unit(s) 156 may include a CPU, a GPU, a CPU and a GPU, or processing units or components known in the art. Additionally, each of the processing unit(s) 156 may possess its own local memory, which also may store program modules, program data, and/or one or more operating systems. Depending on the exact configuration and type of the payment reader device 110, the computer-readable media 158 may include volatile memory (such as RAM), non-volatile memory (such as ROM, flash memory, miniature hard drive, memory card, or the like), or some combination thereof.

In at least one example, the computer-readable media 158 may include at least one module for receiving schedule information and/or signals and managing power states of the payment reader device 110 based on the schedule information and/or signals. The at least one module may be implemented as more modules, and functions described for the at least one module may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 156) to configure the payment reader device 110 to execute instructions and to perform operations described herein. In at least one example, the module may include an execution module 172.

The execution module 172 may receive schedule information and/or signals from the power state management module 146. The execution module 172 may affect changes to power states of the payment reader device 110. That is, the execution module 172 may manage power states of the payment reader device 110 based at least in part on the schedule information and/or signals received from the power state management module 146. As described above, a payment reader device 110 may be associated with different power states. In an example, a payment reader device 110 may operate at a high-power state, a low-power state, or an off state. A high-power state may correspond to a state where the payment reader device 110 may perform high-level functionalities. As described above, a high-power state may correspond to a powered-on state. A low-power state may correspond to a state where the payment reader device 110 may suspend all high-level functionalities, but may retain its data, receive signals, and perform some low-level functionalities. A low-power state may be similar to a sleep mode. An off state may correspond to a state where the payment reader device 110 may suspend all functionality and may not be able to receive signals. In at least one example, the off state may be associated with less than a first threshold amount of power, the low-power state may be associated with more than the first threshold amount of power but less than a second threshold amount of power, and the high-power state may be associated with more than the second threshold amount of power.

The execution module 172 may provide instructions for powering down the payment reader device 110, i.e., changing from a high-power state to a low-power state or an off state. Additionally, the execution module 172 may provide instructions for powering up the payment reader device 110, i.e., changing from a low-power state to a high-power state. Moreover, the execution module 172 may provide instructions for powering down the payment reader device 110, i.e., changing from a high-power state or a low-power state to an off state.

The reader chip 160 may perform functionalities to control the operations and processing of the payment reader device 110. That is, the reader chip 160 may perform functionalities to control payment interfaces (e.g., a contactless interface, a contact interface, etc.), a wireless communication interface, a wired interface, a user interface (e.g., a signal condition device (FPGA)), etc. Additionally, the reader chip 160 may perform functionality to control the timer 164, which may provide a timer signal indicating an amount of time that has lapsed following a particular event (e.g., an interaction, a power-down event, etc.). Moreover, the reader chip 160 may perform functionality to control the clock 166, which may provide a clock signal indicating a time. Furthermore, the reader chip 160 may perform functionality to control the network interface 168, which may interface with the network(s) 106, as described below.

Additionally, the reader chip 160 may perform functionality to control the power supply 170. The power supply 170 may include one or more power supplies such as a physical connection to AC power or a battery. Power supply 170 may include power conversion circuitry for converting AC power and generating a plurality of DC voltages for use by components of payment reader device 110. When power supply 170 includes a battery, the battery may be charged via a physical power connection, via inductive charging, or via any other suitable method. Although not depicted as physically connected to the other components of the payment reader device 110 in FIG. 1, power supply 170 may supply a variety of voltages to the components of the payment reader device 110 in accordance with the requirements of those components.

The transaction chip 162 may perform functionalities relating to processing of payment transactions, interfacing with payment instruments, cryptography, and other payment-specific functionality. That is, the transaction chip 162 may access payment data associated with a payment instrument and may provide the payment data to the POS terminal 208, which may provide the payment data to the payment server(s) 104 for facilitating transactions between the merchant 112A and customer(s). The payment data may include a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip 162 may encrypt the payment data upon receiving the payment data.

It should be understood that in some examples, the reader chip 160 may have its own processing unit(s) and computer-readable media and/or the transaction chip 162 may have its own processing unit(s) and computer-readable media. In other examples, the functionalities of reader chip 160 and transaction chip 162 may be embodied in a single chip or a plurality of chips, each including any suitable combination of processing units and computer-readable media to collectively perform the functionalities of reader chip 160 and transaction chip 162 as described herein.

Furthermore, it should be understood that, in an alternative example, the POS terminal 108 and the payment reader device 110 may both be part of a single device, which may be a battery-operated device. In such an example, components of both the POS terminal 108 and the payment reader device 110 may be associated with the single device. Accordingly, in such an example, the execution module 172 may be associated with the POS application 152, which may manage the power states of the single device.

As described above, the POS system(s) (e.g., POS system 102A and the other merchant POS system(s) 102B) may communicate with the payment server(s) 104 via one or more networks 106. Network(s) 106 may be any type of network known in the art, such as a local area network or a wide area network, such as the Internet, and may include a wireless network, such as a cellular network, a local wireless network, such as Wi-Fi and/or short-range communications, such as Bluetooth® and BLE, NFC, RFID, a wired network, or any other such network, or any combination thereof. Accordingly, network(s) 106 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, POS system 102A, other merchant POS system(s) 102B, and/or the payment server(s) 104 may communicatively couple to network(s) 106 in any manner, such as by a wired or wireless connection. Network(s) 106 may also facilitate communication between the POS system 102A, the other merchant POS system(s) 102B, and/or the payment server(s) 104. In turn, network interfaces (e.g., network interface 118, network interface 142, and network interface 168) may be any network interface hardware components that may allow POS system 102A and/or the payment server(s) 104 to communicate over the network(s) 106. For example, in a particular implementation, the network interface 142 of the POS terminal 108 may include short range communication capabilities for performing the communications involved in POS operations between the POS terminal 108 and the payment reader device 110.

Figure 2:
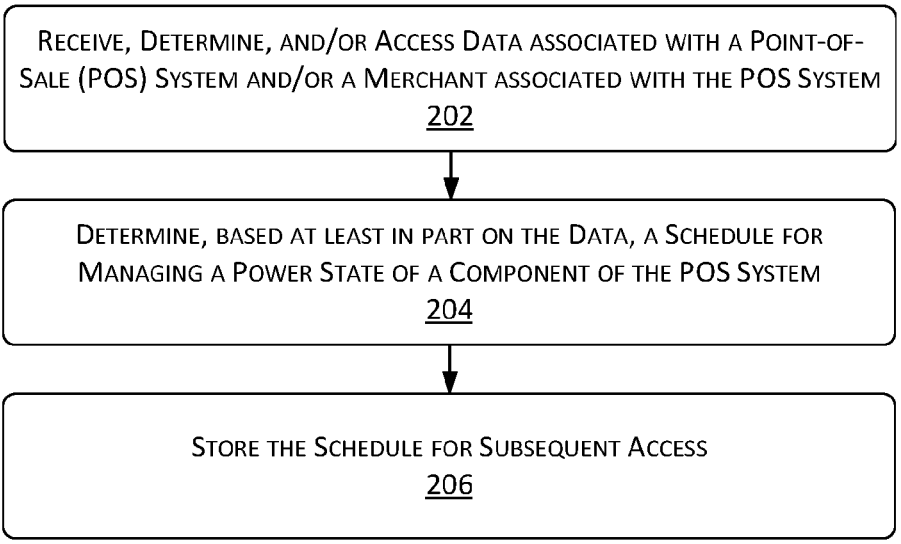
FIG. 2 depicts a non-limiting flow diagram illustrating a method for processing data from a point-of-sale (POS) system of a merchant and/or the merchant to determine a schedule for managing a power state of a component of the POS system.

FIG. 2 depicts a non-limiting flow diagram illustrating a method 200 for processing data associated with a POS system of a merchant and/or the merchant to determine a schedule for managing a power state of a component of the POS system.

Block 202 illustrates receiving, determining, and/or accessing data associated with a POS system and/or a merchant associated with the POS system. In an example, as described above, in the data collection module 144 may receive, determine, and/or access transaction data (and data derived from the transaction data), charging data (and data derived from the charging data), etc. and may send the transaction data, the charging data, etc. to the schedule generation module 120. In an additional and/or alternative example, the schedule generation module 120 may receive transaction data, charging data, etc. and may determine trends and/or patterns based on the transaction data, charging data, etc. In some examples, at least some transaction data, charging data, merchant data, etc. is stored in a merchant profile 132 corresponding to the merchant 112A in the data store 130. In such examples, the schedule generation module 120 may access the transaction data, the charging data, the merchant data, etc. that is stored in a merchant profile 132 corresponding to the merchant 112A.

Block 204 illustrates determining, based at least in part on the data, a schedule for managing a power state of a component of the POS system. For the purpose of this discussion, a schedule may instruct when a payment reader device 110 of a POS system 102A is to change power states. That is, in an example, a schedule may indicate a time interval following an occurrence of an event (e.g., an interaction, a power-down event, etc.) after which the payment reader device 110 is to change power states (e.g., power up, power down, etc.). In some examples, a schedule may be a time-out schedule, which may include a time interval following an interaction with the payment reader device 110 after which the payment reader device 110 is to power down to a low-power state or an off state. That is, the schedule may include instructions directing the payment reader device 110 to power down a predetermined amount of time following an interaction. In other examples, a schedule may be a time-on schedule, which may include a time interval following a power-down of the payment reader device 110 after which the payment reader device 110 is to power up to a high-power state. That is, the schedule may include instructions directing the payment reader device 110 to power up a predetermined amount of time following a power-down of the payment reader device 110. In at least one example, a schedule may include multiple time intervals that correspond to various portions of a day, a week, etc. In another example, a schedule may be associated with a particular time or times at which the payment reader device 110 is to be in predetermined power state(s) (e.g., high-power state, low-power state, etc.).

As described above, in some examples, the schedule generation module 120 may utilize an algorithm to determine a customized schedule for the merchant 112A. In such examples, the schedule generation module 120 may look at trends and/or patterns of transactions associated with a merchant 112A and may determine when a payment reader device 110 associated with the merchant 112A should be powered on and/or when the payment reader device 110 may be powered down. For instance, as a non-limiting example, if transaction data indicates that a POS system 102A associated with a merchant 112A processes a volume of transactions above a threshold between 8:00 am and 10:00 am and again from 4:00 pm to 6:00 pm, the schedule generation module 120 may generate a schedule for the merchant 112A that instructs the payment reader device 110 to be powered on between 8:00 am and 10:00 am and from 4:00 pm to 6:00 pm, but allows the payment reader device 110 to power down between 10:01 am and 3:59 pm. To accomplish this, the schedule generation module 120 may generate a schedule where the time interval for powering down the payment reader device 110 between 8:00 am and 10:00 am and from 4:00 pm to 6:00 pm is longer than the time interval for powering down the payment reader device 110 during other times of the day. That is, between 8:00 am and 10:00 am and from 4:00 pm to 6:00 pm, the schedule may indicate that the payment reader device 110 is to power down after 30 minutes of inactivity (i.e., 30 minutes after a most recent transaction) and the schedule may indicate that the payment reader device 110 is to power down after 10 minutes of inactivity between 10:01 am and 3:59 pm. As another non-limiting example, if transaction data indicates that a POS system 102A associated with a merchant 112A processes cash transactions until 9:00 am when the POS system 102A begins to process transactions via various payment instruments, the schedule generation module 120 may generate a schedule for the merchant 112A that causes the payment reader device 110 to power up at a predetermined time prior to 9:00 am to ensure that the payment reader device 110 is capable of performing its functionalities when the transactions via various payment instruments are expected to begin.

In other examples, the schedule generation module 120 may utilize a machine learning algorithm to determine a customized schedule for the merchant 112A. As described above, machine learning may refer to one or more programs that learns from the data it receives. For example, a machine learning mechanism may build, modify, or otherwise utilize a data model that is created from example inputs and makes predictions or decisions using the data model. In the current example, the machine learning mechanism may be used to predict a schedule for changing a power state of the payment reader device 110 based on when the merchant 112A is likely to use the payment reader device 110 for processing transactions. The data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

The schedule generation module 120 may apply a machine learning algorithm to transaction data inputs, charging data inputs, merchant data inputs, data inputs derived from the transaction data, charging data, merchant data, etc., etc., as described above, to predict a schedule for changing power states of a payment reader device 110 based on when the merchant 112A is likely to use the payment reader device 110. In a non-limiting example, the schedule generation module 120 may utilize data identifying a pattern and/or trend associated with a frequency of transactions processed by the POS system 102A of a merchant 112A, transaction data associated with a sales associate, charging data associated with a length of time that the payment reader device 110 is regularly charged, and merchant data indicating the items offered for acquisition by the merchant 112A to predict a schedule for changing power states of a payment reader device 110 based on when the merchant 112A is likely to use the payment reader device 110. As another non-limiting example, the schedule generation module 120 may utilize data identifying a pattern and/or trend associated with volumes of transactions processed by the POS system 102A of a merchant 112A at time(s) or during time interval(s) within a day, and merchant data indicating a geographic location of the merchant 112A to predict a schedule for changing power states of a payment reader device 110 based on when the merchant 112A is likely to use the payment reader device 110.

Block 206 illustrates storing the schedule for subsequent access. In some examples, the schedule generation module 120 may map, or otherwise associate, a schedule generated by the schedule generation module 120 to a merchant profile 132 corresponding to the merchant 112A.

As described above, in some examples, the schedule generation module 120 may aggregate data from two or more merchants (e.g., merchant 112A, merchant 112B, etc.) and may generate schedule(s) based on the aggregated data. In such examples, the two or more merchants may be associated with a same classification. A classification may correspond to a characteristic of a merchant, such as a geographic location of the merchant, an item offered for acquisition by a merchant, a category (e.g., coffee shop, automotive shop, food truck, retail establishment, etc.) associated with a merchant, etc. As described above, the two or more merchants may be associated with a cohort. In such examples, a schedule may be customized for the cohort of merchants and the schedule generation module 120 may map, or otherwise associate, the schedule with merchant profile(s) 132 corresponding to each of the merchants in the cohort of merchants. As a non-limiting example, the schedule generation module 120 may aggregate data from a group of merchants that all have a coffee shop classification. The schedule generation module 120 may generate a schedule based on the aggregated data. The schedule may be representative of a schedule that is appropriate for other merchants that are also associated with a coffee shop classification. In some examples, a cohort of merchants may have more than one classification in common.

Figure 3:
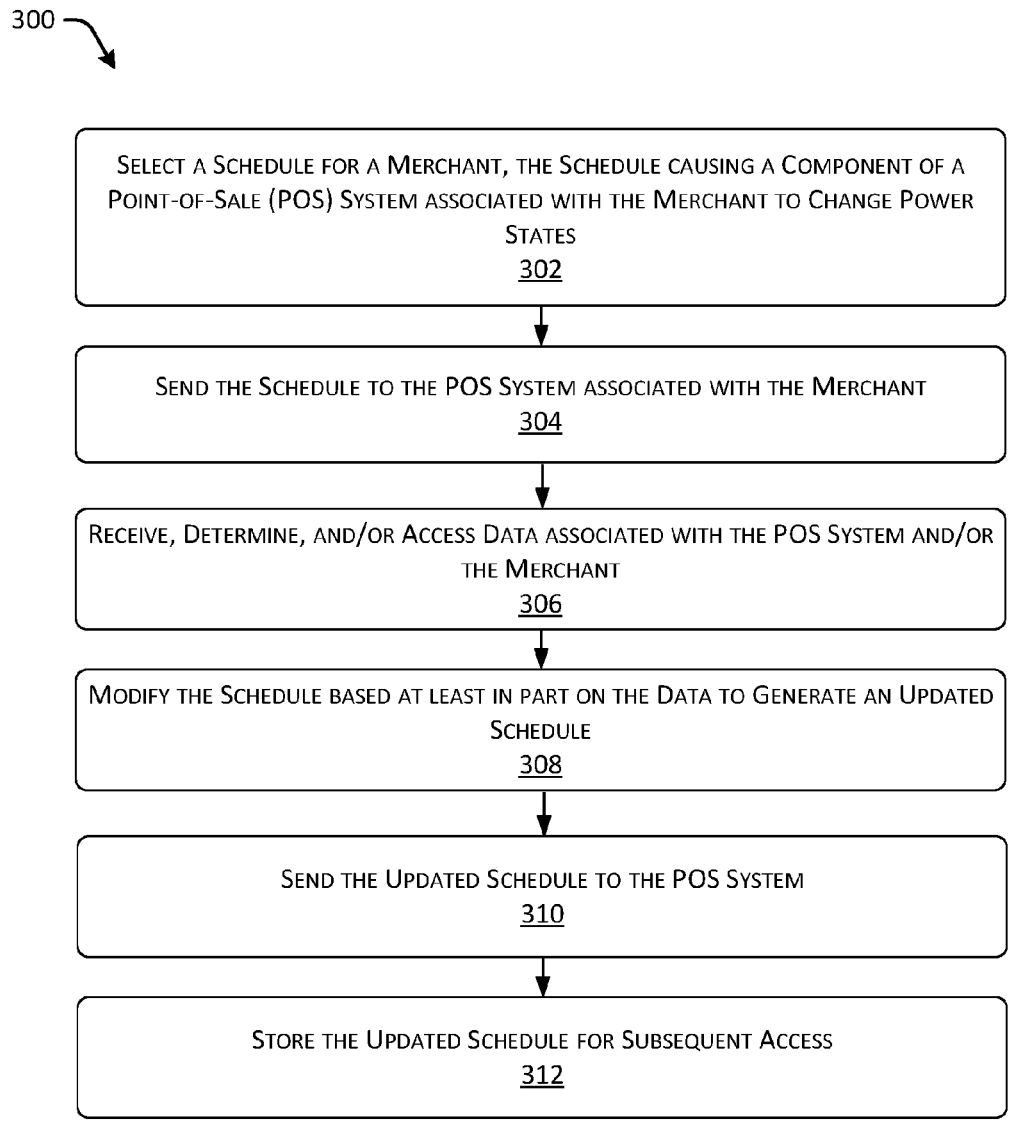
FIG. 3 depicts a non-limiting flow diagram illustrating a method for customizing a schedule for a merchant based on data associated with a POS system of the merchant and/or the merchant.

FIG. 3 depicts a non-limiting flow diagram illustrating a method 300 for customizing a schedule for a merchant based at least in part on data associated with a POS system of the merchant and/or the merchant.

Block 302 illustrates selecting a schedule for a merchant, the schedule causing a component of a POS system associated with the merchant to change power states. In at least one example, the schedule selection module 122 may select a schedule for a merchant 112A. In some examples, the schedule module 148 associated with the POS system 102A of the merchant 112A may send a request for a schedule. The schedule module 148 may send a request for a schedule after a lapse of a predetermined time interval, at a predetermined frequency (e.g., one time per day, one time per week, etc.), at the setup of a new payment reader device 110, etc. In such examples, the schedule selection module 122 may select a schedule for the merchant 112A responsive to the request. In other examples, the schedule selection module 122 may select a schedule for a POS system 102A of a merchant 112A after a lapse of a predetermined time interval, at a predetermined frequency, based on receiving an indication of an updated or new schedule, etc.

In some examples, the schedule selection module 122 may access the data store 130 to determine whether any schedules are mapped to, or otherwise associated with, a merchant profile 132 corresponding to the merchant 112A. Based at least in part on determining that a schedule is mapped to, or otherwise associated with, the merchant profile 132, the schedule selection module 122 may select a schedule for the merchant 112A. In some examples, if more than one schedule is mapped to, or otherwise associated with, the merchant profile 132, the schedule selection module 122 may select the most recently added or updated schedule for the merchant 112A. In some examples, the schedule selection module 122 may select more than one schedule for the merchant 112A. For instance, the schedule selection module 122 may select a time-out schedule and a time-on schedule for the merchant 112A.

In other examples, the schedule selection module 122 may not be able to identify a schedule for the merchant 112A. For instance, perhaps the merchant 112A is a new merchant that has not yet set up a merchant profile. In such examples, the schedule selection module 122 may access a generic schedule that is not customized for any merchant(s). Or, as described below with reference to FIG. 4, the schedule selection module 122 may access a schedule that has been previously generated for other merchants that are determined to be similar to the new merchant.

Block 304 illustrates sending the schedule to the POS system associated with the merchant. The schedule communication module 126 may send the schedule to the POS system 102A. That is, the schedule communication module 126 may receive a schedule from the schedule selection module 122 and may send the schedule to the POS system 102A.

Block 306 illustrates receiving, determining, and/or accessing data associated with the POS system and/or the merchant. In some examples, after the schedule communication module 126 provides a schedule to the POS system 102A, the schedule generation module 120 may continue to receive, determine, and/or access data associated with the POS system 102A and/or the merchant 112A. That is, the schedule generation module 120 may receive, determine, and/or access updated data associated with the POS system 102A and/or the merchant 112A in order to iteratively update the schedule and/or generate new schedule(s).

Block 308 illustrates modifying the schedule based at least in part on the data to generate an updated schedule. In at least one example, the schedule generation module 120 may modify the schedule based at least in part on updated data associated with the POS system 102A and/or the merchant 112A. In some examples, the schedule generation module 120 may utilize an algorithm to modify the schedule to generate the updated schedule for the merchant 112A. For instance, as a non-limiting example, a schedule may include a time interval for powering down the payment reader device 110 after 10 minutes of inactivity between the hours of 7:00 am and 8:30 am. However, if updated transaction data indicates that a POS system 102A associated with a merchant 112A processes a volume of transactions above a threshold between 8:00 am and 10:00 am, the schedule generation module 120 may modify the schedule for the merchant 112A so that the time interval for powering down the payment reader device 110 between 8:00 am and 8:30 am is longer than the time interval for powering down the payment reader device 110 between 7:00 am and 7:59 am. That is, the schedule generation module 120 may modify the schedule for the merchant so that the payment reader device 110 does not power down as quickly as it did previously based on the new transaction data indicating that the merchant 112A is likely to use the payment reader device 110 in a high-power state from 8:00 am to 10:00 am.

In other examples, the schedule generation module 120 may utilize a machine learning algorithm to modify the schedule for the merchant 112A. In the current example, the machine learning mechanism may utilize the updated data to predict an updated schedule for changing a power state of the payment reader device 110 based on when the merchant 112A is likely to use the payment reader device 110 for processing transactions.

In some examples, the updated schedule may be a new schedule. In other examples, the schedule previously sent to the POS system 102A may be modified to generate the updated schedule.

Block 310 illustrates sending the updated schedule to the POS system. The schedule communication module 126 may send the updated schedule to the POS system 102A. That is, the schedule communication module 126 may receive an updated schedule from the schedule selection module 122 and may send the updated schedule to the POS system 102A.

Block 312 illustrates storing the updated schedule for subsequent access. In some examples, the schedule generation module 120 may map, or otherwise associate, a schedule generated by the schedule generation module 120 to a merchant profile 132 corresponding to the merchant 112A, as described above.

Figure 4:
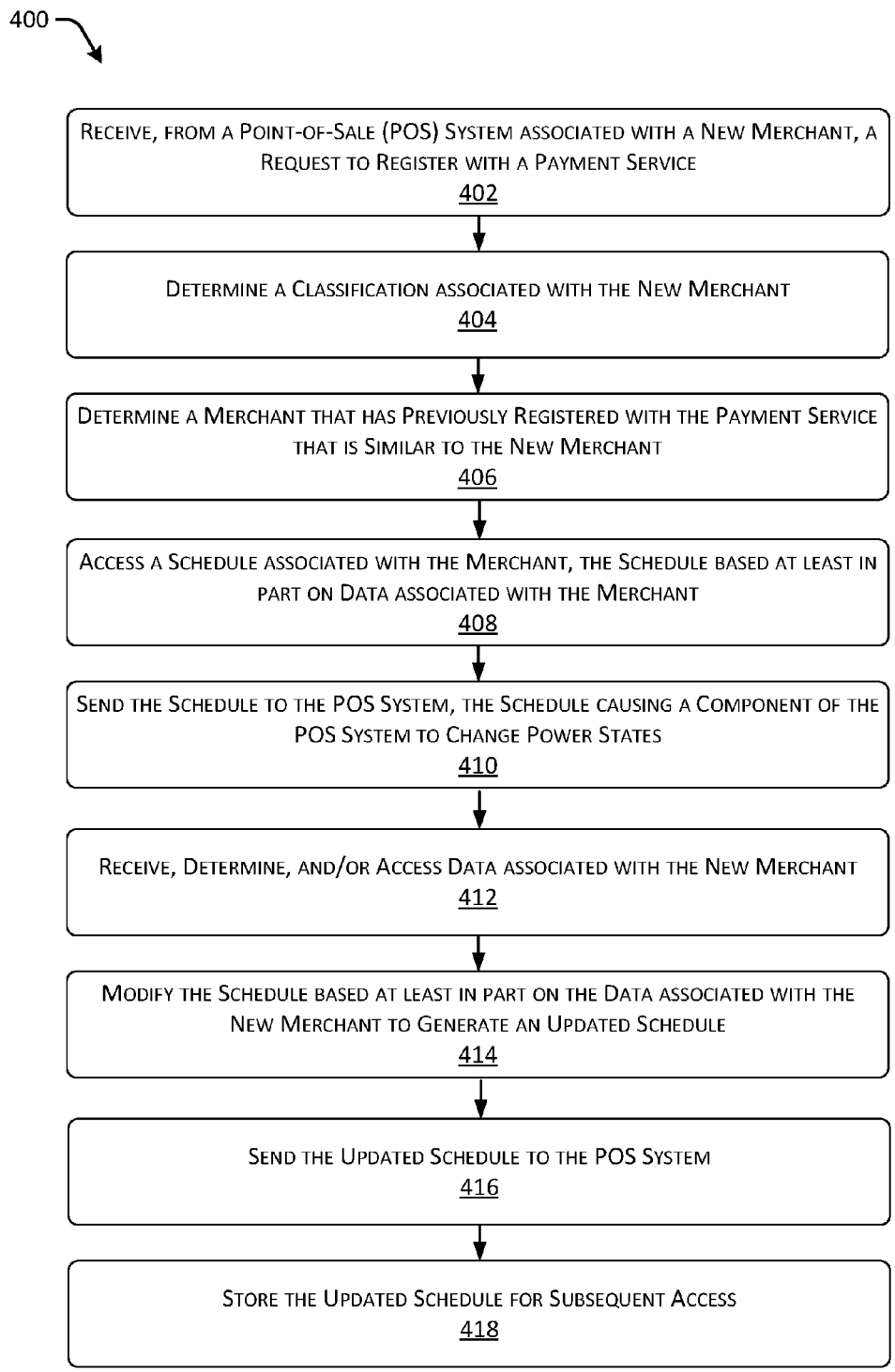
FIG. 4 depicts a non-limiting flow diagram illustrating a method for determining a schedule for a new merchant based on schedules previously determined for other merchants having similar characteristics as the new merchant, and customizing the schedule for the new merchant based on data associated with a POS system of the new merchant and/or the new merchant.

FIG. 4 depicts a non-limiting flow diagram illustrating a method 400 for determining a schedule for a new merchant based on schedules previously determined for other merchants having similar characteristic(s) as the new merchant, and customizing the schedule for the new merchant based on data associated with the POS system of the new merchant and/or the new merchant.

Block 402 illustrates receiving, from a POS system associated with a new merchant, a request to register with a payment service. In at least one example, a new merchant (e.g., merchant 112A) may purchase a payment reader device 110 and may request to register with a payment service associated with the payment reader device 110. That is, the new merchant (e.g., merchant 112A) may be a new merchant such that it has not previously registered with the payment service and/or the payment service does not have any data associated with the new merchant (e.g., merchant 112A) stored in a merchant profile 132. The new merchant (e.g., merchant 112A) may set up the payment reader device 110 and the POS system 102A may send a request to register with the payment service. The schedule selection module 122 may receive the request. The schedule selection module 122 may determine whether any of the merchant profile(s) 132 correspond to the new merchant (e.g., merchant 112A). Based at least in part on determining that the none of the merchant profile(s) 132 correspond to the new merchant (e.g., merchant 112A), the schedule selection module 122 may send the request to the merchant matching module 124.

Block 404 illustrates determining a classification associated with the new merchant. The merchant matching module 124 may receive the request from the schedule selection module 122. In some examples, the request may include merchant data associated with the new merchant (e.g., merchant 112A). For instance, when a new merchant (e.g., merchant 112A) sets up a merchant profile, the new merchant (e.g., merchant 112A) may include merchant data, which may indicate information about a merchant (e.g., name of the merchant, geographic location of the merchant, types of items offered for acquisition by the merchant, operating hours of the merchant, a category of the merchant, etc.), accounting information associated with the merchant (e.g., bank(s) that the merchant banks with, etc.), transactional information associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), etc. Based at least in part on the merchant data, the merchant matching module 124 may classify the new merchant (e.g., merchant 112A). That is, the merchant matching module 124 may determine at least one classification associated with the new merchant (e.g., merchant 112A). The classification may correspond to a characteristic of the new merchant (e.g., merchant 112A), such as a geographic location of the new merchant (e.g., merchant 112A), an item offered for acquisition by the new merchant (e.g., merchant 112A), a category (e.g., coffee shop, automotive shop, food truck, retail establishment, etc.) associated with the new merchant (e.g., merchant 112A), etc.

Block 406 illustrates determining a merchant that has previously registered with the payment service that is similar to the new merchant.

In an example, the merchant matching module 124 may identify a merchant (e.g., merchant 112B) that has previously registered with a payment service that is also associated with the at least one classification. In such an example, the merchant matching module 124 may utilize a matching algorithm to determine a merchant (e.g., merchant 112B) that shares the at least one classification with the new merchant (e.g., merchant 112A). For instance, the merchant matching module 124 may determine that the new merchant (e.g., merchant 112A) is associated with a coffee shop and the merchant (e.g., merchant 112B) is also associated with a coffee shop. Accordingly, the merchant matching module 124 may determine that the new merchant (e.g., merchant 112A) and the merchant (e.g., merchant 112B) share at least one classification. As such, the merchant matching module 124 may determine that the merchant (e.g., merchant 112B) is similar to the new merchant (e.g., merchant 112A).

In an additional and/or alternative example, the merchant matching module 124 may compare classification(s) associated with the new merchant (e.g., merchant 112A) with classification(s) associated with one or more other merchants (e.g., merchant 112B, etc.) and may determine a similarity score indicative of a similarity between the new merchant (e.g., merchant 112A) and each of the one or more other merchants (e.g., merchant 112B, etc.). In such examples, the merchant matching module 124 may rank the one or more other merchants (e.g., merchant 112B, etc.) based at least in part on corresponding similarity scores. The merchant matching module 124 may determine that a top ranking merchant of the one or more other merchants (e.g., merchant 112B, etc.) is most similar to the new merchant (e.g., merchant 112A). Or, the merchant matching module 124 may determine that a predetermined number of top ranking merchants of the one or more other merchants (e.g., merchant 112B, etc.) are most similar to the new merchant (e.g., merchant 112A). Alternatively, the merchant matching module 124 may determine that merchant(s) having a similarity score above a threshold score are most similar to the new merchant (e.g., merchant 112A).

Block 408 illustrates accessing a schedule associated with the merchant, the schedule based at least in part on data associated with the merchant. In an example, the merchant matching module 124 may provide an indication of a merchant (e.g., merchant 112B, etc.) that that is similar to the new merchant (e.g., merchant 112A) to the schedule selection module 122. In some examples, the schedule selection module 122 may access a schedule associated with the merchant (e.g., merchant 112B) to send to the POS system 102A associated with the new merchant (e.g., merchant 112A). That is, the schedule selection module 122 may access a merchant profile 132 corresponding to the merchant (e.g., merchant 112B) and may access a schedule that is mapped to, or otherwise associated with, the merchant profile 132.

In an additional and/or alternative example, the merchant matching module 124 may provide an indication of the one or more other merchants (e.g., merchant 112B, etc.) that are most similar to the new merchant (e.g., merchant 112A) to the schedule selection module 122. The schedule selection module 122 may access schedule(s) associated with the one or more other merchants (e.g., merchant 112B, etc.) to send to the POS system 102A associated with the new merchant (e.g., merchant 112A). In some examples, if more than one schedule is associated with the one or more other merchants (e.g., merchant 112B, etc.), the schedule selection module 122 may send all of the schedules to the POS system 102A associated with the new merchant (e.g., merchant 112A). In other examples, if more than one schedule is associated with the one or more other merchants (e.g., merchant 112B, etc.), the schedule selection module 122 may send a schedule associated with the merchant that is most similar to the new merchant (e.g., merchant 112A) to the POS system 102A associated with the new merchant (e.g., merchant 112A). That is, the schedule selection module 122 may access a schedule that is mapped to, or otherwise associated with, the merchant having a highest similarity score to provide to the POS system 102A associated with the new merchant (e.g., merchant 112A).

In at least one example, the schedule selection module 122 may request the schedule generation module 120 to generate a new schedule based on data associated with the merchant (e.g., merchant 112B) or the one or more other merchants (e.g., merchant 112B, etc.). For instance, in an example, the schedule selection module 122 may not be able to access a schedule associated with the merchant (e.g., merchant 112B) or the one or more other merchants (e.g., merchant 112B, etc.). Or, the one or more merchants (e.g., merchant 112B, etc.) may be associated with multiple schedules. The schedule generation module 120 may generate a new schedule for the new merchant (e.g., merchant 112A) based on data associated with the merchant (e.g., merchant 112B) or the one or more other merchants (e.g., merchant 112B, etc.) that have been determined to be similar to the new merchant (e.g., merchant 112A).

Block 410 illustrates sending the schedule to the POS system, the schedule causing a component of the POS system to change power states. The schedule communication module 126 may send the schedule to the POS system 102A. That is, the schedule communication module 126 may receive the schedule from the schedule selection module 122 and may send the schedule to the POS system 102A. Accordingly, the POS system 102A may manage power states of the payment reader device 110 based on a schedule derived from data associated with one or more other merchants (e.g., merchant 112B, etc.) that are similar to the new merchant (e.g., merchant 112A). For instance, if the new merchant (e.g., merchant 112A) is associated with a coffee shop, the POS system 102A associated with the new merchant (e.g., merchant 112A) may manage the power states associated with its payment reader device 110 based on a schedule associated with another merchant (e.g., merchant 112B) that is also associated with a coffee shop.

Block 412 illustrates receiving, determining, and/or accessing data associated with the POS system and/or the merchant. In some examples, after the new merchant (e.g., merchant 112A) registers with the payment service, the schedule generation module 120 may begin to receive, determine, and/or access data associated with the POS system 102A and/or the new merchant (e.g., merchant 112A). That is, the schedule generation module 120 may receive, determine, and/or access updated data associated with the POS system 102A and/or the new merchant (e.g., merchant 112A) in order to customize a schedule for the new merchant (e.g., merchant 112A) and iteratively update the schedule and/or generate new schedule(s).

Block 414 illustrates modifying the schedule based at least in part on the data to generate an updated schedule. In at least one example, the schedule generation module 120 may modify the schedule based at least in part on updated data associated with the POS system 102A and/or the new merchant (e.g., merchant 112A). In some examples, the schedule generation module 120 may utilize an algorithm to modify the schedule to generate the updated schedule for the new merchant (e.g., merchant 112A). For instance, as a non-limiting example, a schedule (generated from data associated with similar merchant(s)) may include a time interval for powering down the payment reader device 110 after 10 minutes of inactivity between the hours of 7:00 am and 11:00 am. However, if updated transaction data indicates that a POS system 102A associated with the new merchant (e.g., merchant 112A) processes a volume of transactions above a threshold between 10:00 am and 2:00 pm, the schedule generation module 120 may modify the schedule for the new merchant (e.g., merchant 112A) so that the time interval for powering down the payment reader device 110 between 10:00 am and 11:00 am is longer than the time interval for powering down the payment reader device 110 between 7:00 am and 9:59 am. That is, the schedule generation module 120 may modify the schedule for the merchant so that the payment reader device 110 does not power down as quickly as it did previously, based on the new transaction data indicating that the new merchant (e.g., merchant 112A) is likely to need the payment reader device 110 to be in a high-power state (e.g., powered on) starting at 10:00 am.

In other examples, the schedule generation module 120 may utilize a machine learning algorithm to modify the schedule for the new merchant (e.g., merchant 112A). In the current example, the machine learning mechanism may utilize the updated data to predict an updated schedule for changing a power state of the payment reader device 110 based on when the new merchant (e.g., merchant 112A) is likely to use the payment reader device 110 for processing transactions.

In some examples, the updated schedule may be a new schedule. In other examples, the schedule previously sent to the POS system 102A may be modified to generate the updated schedule.

Block 416 illustrates sending the updated schedule to the POS system. The schedule communication module 126 may send the updated schedule to the POS system 102A. That is, the schedule communication module 126 may receive an updated schedule from the schedule selection module 122 and may send the updated schedule to the POS system 102A.

Block 418 illustrates storing the updated schedule for subsequent access. In some examples, the schedule generation module 120 may map, or otherwise associate, a schedule generated by the schedule generation module 120 to a merchant profile 132 corresponding to the new merchant (e.g., merchant 112A), as described above.

Figure 5:
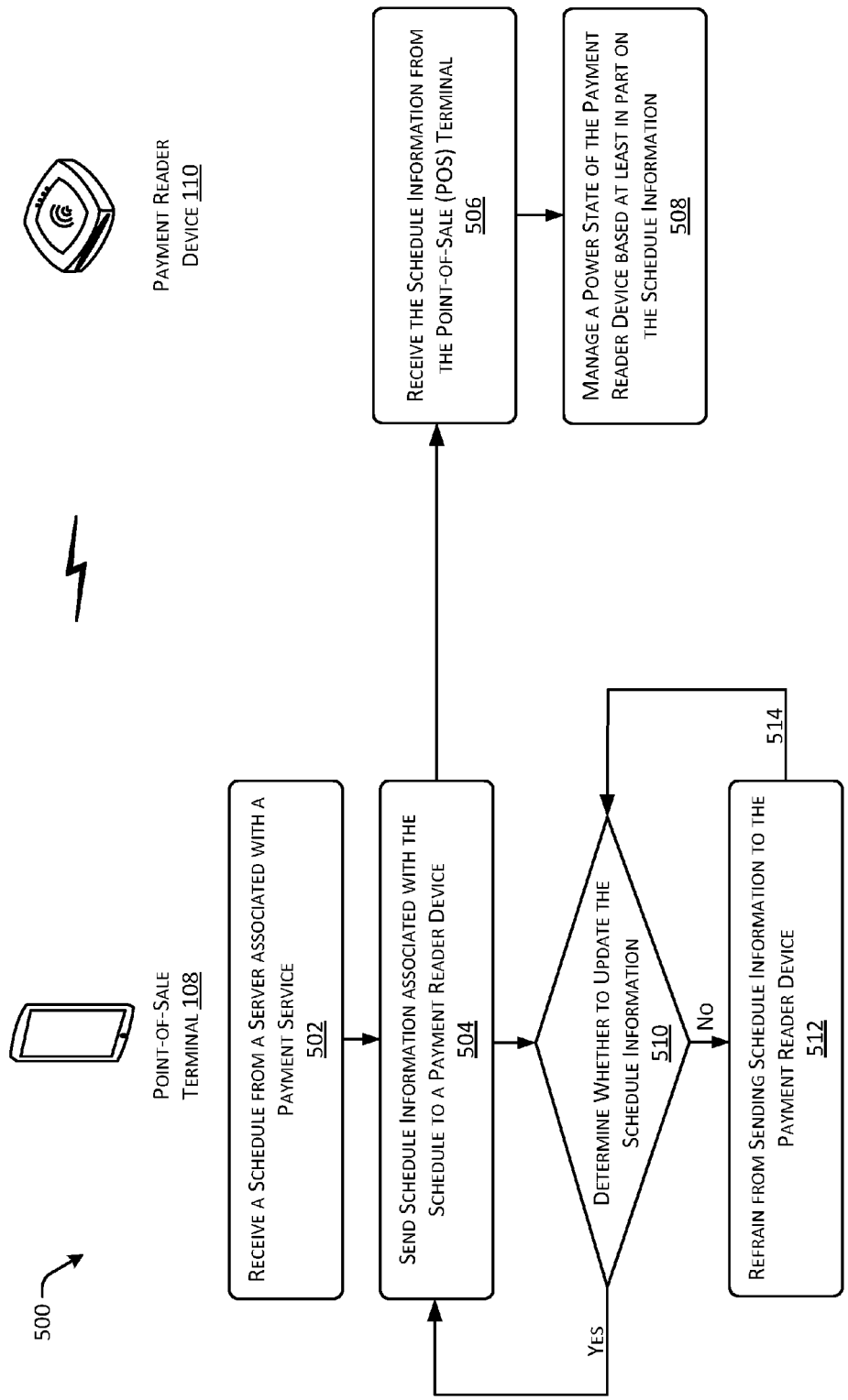
FIG. 5 depicts a non-limiting flow diagram illustrating a method for receiving a schedule from a server associated with a payment service and sending schedule information associated with the schedule to a payment reader device.

FIG. 5 depicts a non-limiting flow diagram illustrating a method 500 for receiving a schedule from a server associated with a payment service and sending schedule information associated with the schedule to a payment reader device.

Block 502 illustrates receiving a schedule from a server associated with a payment service. As described above, the schedule communication module 126 may send a schedule to the POS system 102A. That is, the schedule communication module 126 may receive a schedule from the schedule selection module 122 and may send the schedule to the schedule module 148. In at least one example, the schedule module 148 may receive the schedule from the payment server(s) 104.

Block 504 illustrates sending schedule information associated with the schedule to a payment reader device. In at least one example, the schedule module 148 may generate schedule information based on the schedule. Schedule information may include a complete schedule, a portion of a schedule, or a signal generated based on a schedule. For instance, in some examples, the schedule module 148 may send schedule information corresponding to an entire schedule to the payment reader device 110 and the payment reader device 110 may manage its power states based on the schedule. Or, in other examples, the schedule module 148 may send schedule information corresponding to a first portion of a schedule associated with instructions directing the payment reader device 110 to change power states a first time interval (e.g., a predetermined amount of time) after an event (e.g., an interaction with the payment reader device 110, a power-down of the payment reader device 110, etc.). At a subsequent time, the schedule module 148 may send schedule information associated with a second portion of the schedule associated with instructions directing the payment reader device 110 to change power states a second time interval (e.g., predetermined amount of time) after an event (e.g., an interaction with the payment reader device 110, a power-down of the payment reader device 110, etc.). The schedule module 148 may send subsequent schedule information associated with subsequent portions of the schedule as appropriate. In some examples, the schedule module 148 may send portions of a schedule based on when time intervals associated with a schedule change. In other examples, the schedule module 148 may send portions of the schedule after a lapse of a predetermined time interval, at a predetermined frequency, etc. In such examples, the time interval associated with a first portion of the schedule may be a same time interval as the time interval associated with a second portion of the schedule or a different time interval.

In some examples, the payment reader device 110 may be in a low-power state when schedule information is sent from the schedule module 148. In such examples, the payment reader device 110 may receive the new schedule information, power up to a high-power state to process the new schedule information, and return to the low-power state until the schedule information indicates the payment reader device 110 is to change power states.

As described above, in at least one example, the schedule information may be a signal. In such an example, the schedule may be associated with a particular time or times at which the payment reader device 110 is to be in particular power states. For instance, the schedule may include a first time at which the payment reader device 110 is to be in a high-power state (e.g., powered-on), a second time at which the payment reader device 110 is to be in a high-power state (e.g., powered-on), a third time at which the payment reader device 110 is to be in a low-power state (e.g., powered-down), etc. In such an example, the schedule module 148 may send a first signal a predetermined amount of time before the first time to power up the payment reader device 110 indicating a predetermined power state (e.g., high-power state), a second signal a predetermined amount of time before at the second time indicating a predetermined power state (e.g., high-power state), a third signal a predetermined amount of time before the third time indicating a predetermined power state (e.g., low-power state), etc.

Block 506 illustrates receiving the schedule information from the POS terminal. The execution module 172 may receive schedule information and/or signals from the power state management module 146.

Block 508 illustrates managing a power state of the payment reader device based at least in part on the schedule information. The execution module 172 may affect changes to power states of the payment reader device 110. That is, the execution module 172 may manage power states of the payment reader device 110 based at least in part on the schedule information and/or signals received from the power state management module 146. As described above, a payment reader device 110 may be associated with different power states. In an example, a payment reader device 110 may operate at a high-power state, a low-power state, or an off state. The execution module 172 may provide instructions for powering down, i.e., changing from a high-power state to a low-power state or off state or changing from a low-power state to an off state. Additionally, the execution module 172 may provide instructions for powering up, i.e., changing from a low-power state to a high-power state. Additional details associated with managing the power state of the payment reader device 110 are described below with reference to FIGS. 6 and 7.

Block 510 illustrates determining whether to update the schedule information. In some examples, such as when the schedule information is associated with a portion of a schedule, the schedule module 148 may send updated schedule information corresponding to other portions of the schedule to the payment reader device 110. In such examples, the schedule module 148 may access a schedule and determine whether to send updated schedule information to the payment reader device 110. In some examples, the schedule module 148 may access the schedule after a lapse of a predetermined time interval, at a predetermined frequency, based on determining a change in a time interval associated with the schedule, etc. Based at least in part on determining that updated schedule information is available, the schedule module 148 may send the updated schedule information to the payment reader device 110.

In additional and/or alternative examples, the schedule module 148 may receive an updated schedule. The schedule module 148 may receive an updated schedule after a lapse of a predetermined time interval, at a predetermined frequency, based on the schedule generation module 120 generating an updated schedule, etc. Based at least in part on receiving an updated schedule, the schedule module 148 may generate updated schedule information and send the updated schedule information to the payment reader device 110.

Block 512 illustrates refraining from sending schedule information to the payment reader device. In some examples, the schedule module 148 may determine that the schedule information does not need to be updated. For instance, in an example where the schedule information is a complete schedule, the schedule module 148 may refrain from sending updated schedule information to the payment reader device 110. Or, in an example where the schedule information is a portion of a schedule and the schedule module 148 determines whether to update the schedule information after a lapse of a predetermined time interval or at a predetermined frequency, and the portion of the schedule is still relevant (e.g., the time interval has not changed), the schedule module 148 may refrain from sending updated schedule information to the payment reader device 110. The schedule module 148 may iteratively assess whether to update the schedule information, as shown by arrow 514 returning to block 510.

Figure 6:
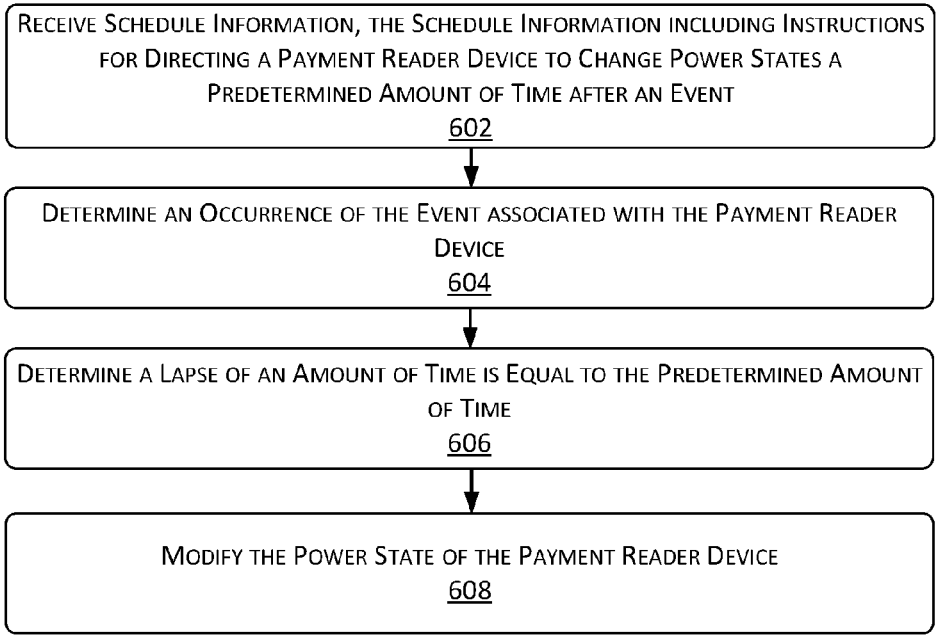
FIG. 6 depicts a non-limiting flow diagram illustrating a method for managing a power state of a payment reader device based at least in part on schedule information.

FIG. 6 depicts a non-limiting flow diagram illustrating a method 600 for managing a power state of a payment reader device based at least in part on schedule information.

Block 602 illustrates receiving schedule information, the schedule information including instructions for directing a payment reader device to change power states a predetermined amount of time after an event. The execution module 172 may receive schedule information from the schedule module 148 indicating a time interval (i.e., a predetermined amount of time) following an occurrence of an event (e.g., an interaction, a power-down event, etc.) after which the payment reader device 110 is to change power states (e.g., power up, power down, etc.).

Block 604 illustrates determining an occurrence of the event associated with the payment reader device. In an example, the schedule information may indicate a time interval following an occurrence of an event after which the payment reader device 110 is to change power states (e.g., power up, power down, etc.). In some examples, a schedule may be a time-out schedule, which may include a time interval following an interaction with the payment reader device 110 after which the payment reader device 110 is to power down to a low-power state or an off state. That is, the event may correspond to an interaction with the payment reader device 110. In such an example, the execution module 172 may determine an occurrence of an interaction with the payment reader device 110. In other examples, a schedule may be a time-on schedule, which may include a time interval following a power-down of the payment reader device 110 after which the payment reader device 110 is to power up to a high-power state. That is, the event may correspond to a power-down event which changed the power state of the payment reader device 110 from a high-power state to a low-power state. In such an example, the execution module 172 may determine an occurrence of a power-down event.

Block 606 illustrates determining a lapse of an amount of time is equal to the predetermined amount of time. In at least one example, the timer 164 may provide a timer signal indicating an amount of time that has lapsed following a particular event (e.g., an interaction, a power-down event, etc.). The execution module 172 may determine that the amount of time that has lapsed is equal to the time interval (e.g., predetermined amount of time) provided in the schedule information.

Block 608 illustrates modifying the power state of the payment reader device. Based at least in part on determining that the amount of time that has lapsed is equal to the predetermined amount of time, the execution module 172 may modify the power state of the payment reader device 110. For instance, if the schedule is a time-out schedule for powering down the payment reader device 110 to a low-power state or an off state, the execution module 172 may provide instructions for the reader chip 160 to power down the payment reader device 110 from a high-power state to a low-power state or an off state. In other examples, if the schedule is a time-on schedule for powering up the payment reader device 110 to a high-power state, the execution module 172 may provide instructions for the reader chip 160 to power up the payment reader device 110 from a low-power state to a high-power state.

In some examples, the schedule information may correspond to a portion of the schedule, which may be associated with a single time interval following an occurrence of an event (e.g., an interaction, a power-down event, etc.) after which the payment reader device 110 is to change power states (e.g., power up, power down, etc.). In such examples, the execution module 172 may be concerned with a single time interval (i.e., the time interval associated with the schedule information). However, in examples where the schedule information corresponds to a complete schedule, the schedule information may be associated with multiple time intervals which may correspond to different portions of a day. For instance, a first time interval may be in effect from 6:00 am to 10:00 am, a second time interval may be in effect from 10:01 am to 1:00 pm, a third time interval may be in effect from 1:01 pm to 6:00 pm, etc. In such examples, the execution module 172 may rely on a clock signal received from the clock 166 to determine which time interval to follow. For instance, the execution module 172 may leverage the clock signal to determine a current time of 8:00 am. Accordingly, the execution module 172 may modify the power state of the payment reader device 110 after a lapse of the first time interval, as determined by the timer signal from the timer 164.

Figure 7:
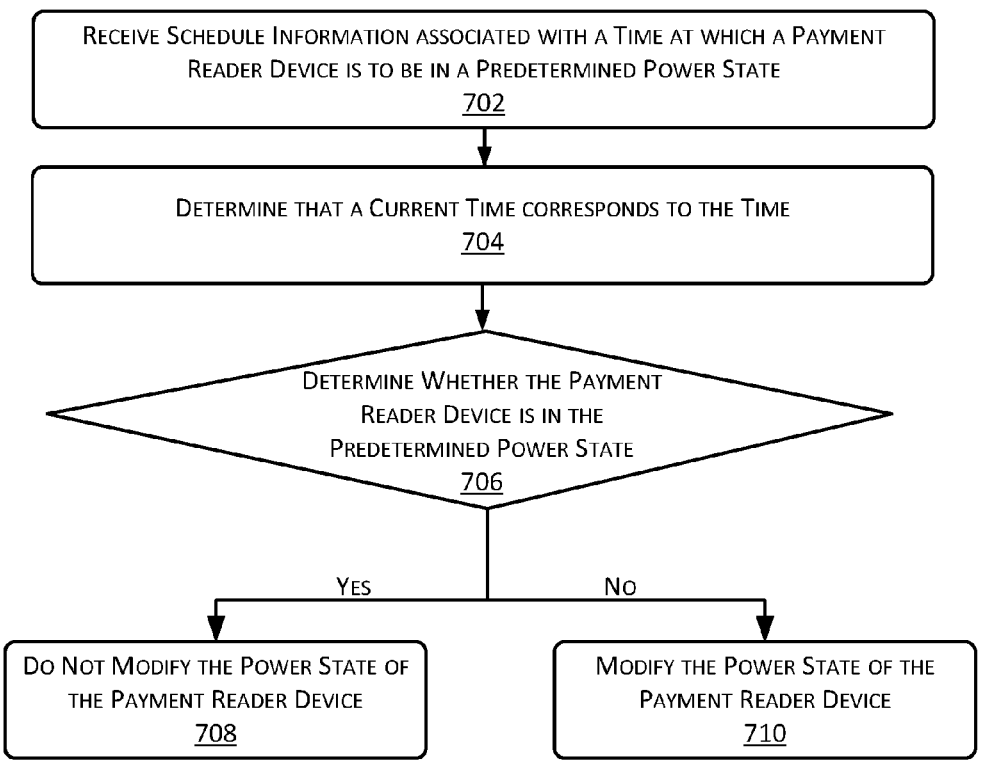
FIG. 7 depicts a non-limiting flow diagram illustrating a method for managing a power state of a payment reader device based at least in part on schedule information.

FIG. 7 depicts a non-limiting flow diagram illustrating a method 700 for managing a power state of a payment reader device based at least in part on schedule information.

Block 702 illustrates receiving schedule information associated with a time at which a payment reader device 110 is to be in a predetermined power state. The execution module 172 may receive schedule information from the schedule module 148 indicating a time at which the payment reader device 110 is to be in a particular power state (e.g., high-power state, low-power state, off state, etc.). The particular power state may correspond to a predetermined power state. As a non-limiting example, the schedule information may indicate that the power state of the payment reader device 110 at 10:00 am is to be a high-power state. In such an example, the predetermined power state is a high-power state.

Block 704 illustrates determining that a current time corresponds to the time. The execution module 172 may receive a clock signal from the clock 166. The execution module 172 may determine that the clock signal indicates that the current time corresponds to the time at which the payment reader device 110 is to change power states.

Block 706 illustrates determining whether the payment reader device is in the predetermined power state. Based at least in part on determining that the clock signal indicates that the current time corresponds to the time at which the payment reader device 110 is to be in a predetermined power state, the execution module 172 may assess the power state of the payment reader device 110 to determine whether it is in the predetermined power state. Based at least in part on determining that the payment reader device 110 is already in the predetermined power state, the execution module 172 may not modify the power state of the payment reader device 110, as shown in block 708. However, based at least in part on determining that the payment reader device 110 is not in the predetermined power state, the execution module 172 may modify the power state of the payment reader device 110 so that it is in the predetermined power state, as illustrated in block 710. For instance, if the payment reader device 110 determines that it is in a low-power state, and the schedule information indicates that the payment reader device 110 is to be in a high-power state at 10:00 am, the execution module 172 may provide instructions for the reader chip 160 to power up the payment reader device 110 to a high-power state.

In some examples, the schedule module 148 on the POS terminal 108 may send a signal to ensure that the payment reader device 110 is in the predetermined power state. For instance, based at least in part on the schedule module 148 determining that the current time corresponds to the time associated with the schedule instructions, the schedule module 148 may send a request to the execution module 172 to determine the current power state of the payment reader device 110. In such examples, the schedule module 148 may ping the payment reader device 110 to determine whether it responds. If the payment reader device 110 does not respond, the schedule module 148 may determine that the payment reader device 110 is in an off state. Or, if the payment reader device 110 responds, the schedule module 148 may determine that the payment reader device 110 is in a high-power state or a low-power state. In at least one example, the schedule module 148 may utilize the amount of time that the payment reader device 110 takes to respond to determine whether the payment reader device 110 is in a high-power state or a low-power state. That is, if the payment reader device 110 is in a low-power state, the payment reader device 110 may take longer to respond than if the payment reader device 110 is in a high-power state. The schedule module 148 may compare the current power state of the payment reader device 110 with the predetermined power state to determine whether the current power state matches the predetermined power state.

If the payment reader device 110 is not in the predetermined power state, the schedule module 148 may send a signal instructing the execution module 172 to modify the power state of the payment reader device 110. For instance, if the schedule module 148 determines that the payment reader device 110 is in a low-power state, and the schedule information indicates that the payment reader device 110 is to be in a high-power state at 10:00 am, the schedule module 148 may provide instructions to the execution module 172, which will provide instructions to the reader chip 160 to power up the payment reader device 110 to a high-power state.

Figure 8:
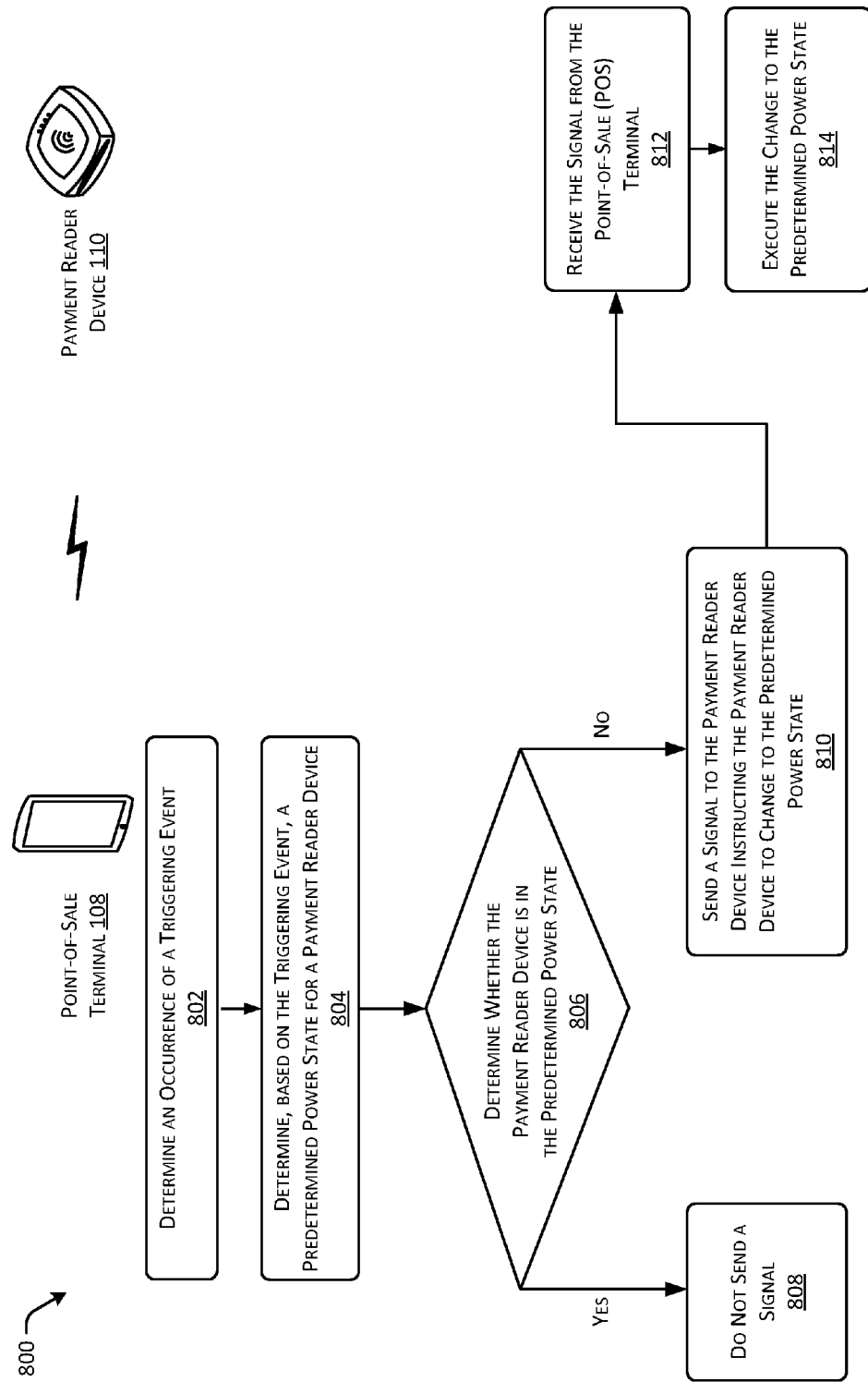
FIG. 8 depicts a non-limiting flow diagram illustrating a method for determining an occurrence of a triggering event and, based on determining that a payment reader device is not in a predetermined power state, transmitting a signal to a payment reader device to change to the predetermined power state.

FIG. 8 depicts a non-limiting flow diagram illustrating a method for determining an occurrence of a triggering event and, based on determining that a payment reader device is not in a predetermined power state, transmitting a signal to a payment reader device to change to the predetermined power state.

Block 802 illustrates determining an occurrence of a triggering event. The event module 150 may determine an occurrence of a triggering event. A triggering event may be an event, the occurrence of which, may warrant a change to the power state of the payment reader device 110. In some examples, the change to the power state may be inconsistent with a schedule that is currently being implemented. That is, the occurrence of a triggering event may warrant overriding a schedule that is currently being implemented.

Examples of triggering events may include determining the presence (or lack thereof) of a sales associate or a customer. In such examples, the event module 150 may access data from one or more sensors (e.g., input/output interface(s) 140) that may indicate the presence or absence of a sales associate or customer. For instance, a camera associated with the POS terminal 108 may provide image data to the event module 150. The event module 150 may perform image processing techniques on the image data to determine the presence of a sales associate. Or, a sensor associated with the POS terminal 108 may detect the presence of a wireless signal (e.g., Bluetooth, Wi-Fi, etc.) associated with a device corresponding to a customer. The sensor may provide data to the event module 150. In at least one example, the event module 150 may determine that the device is within a threshold distance of the POS system 102 and may determine the presence of a customer. Or, a sensor associated with a brick-and-mortar store may send a signal to the event module 150 indicating the presence of a customer.

Additional and/or alternative examples of triggering events may include changes to conditions associated with an ambient environment of the POS system 102. For instance, one or more sensors (e.g., input/output interface(s) 140) may sense changes in light, noise, temperature, etc., which may indicate whether a payment reader device 110 should be powered up or powered down. For instance, a triggering event may occur when the one or more sensors (e.g., input/output interface(s) 140) determine that a light level and/or noise level drop below a predetermined threshold.

In some examples, triggering events may be based on interactions with a POS application, such as POS application 152. For instance, opening the POS application or closing the POS application may correspond to triggering events. Or, a sales associate logging-in to the POS application or logging-out of the POS application may correspond to triggering events. Additional and/or alternative examples of triggering events may be based on connections or disconnections of the POS terminal 108 and the payment reader device 110. For instance, a triggering event may occur when the event module 150 determines that the payment reader device 110 is disconnected from the POS terminal 108.

In some examples, calendars or merchant data (e.g., operating hours, holidays, etc.) may be used to determine the occurrence of triggering events. For instance, the event module 150 may access a calendar associated with a merchant 112A, which may indicate that the merchant 112A is closing its business at a particular time on a particular date. Accordingly, on the particular date at the particular time, the event module 150 may determine the occurrence of a triggering event.

Block 804 illustrates determining, based on the triggering event, a predetermined power state for a payment reader device. Each triggering event may correspond with a predetermined power state. For instance, the presence of a sales associate or customer may be associated with the desire for the payment reader device 110 to be powered up to a high-power state. Conversely, the disappearance of a sales associate or a customer may be associated with the desire for the payment reader device 110 to be powered down to a low-power state or off state. Moreover, opening a POS application or logging-in to the POS application may be associated with the desire for the payment reader device 110 to be powered up to a high-power state. Conversely, closing a POS application or logging-off of the POS application may be associated with the desire for the payment reader device 110 to be powered down to a low-power state. In at least one example, the event module 150 may determine the predetermined power state for a payment reader device 110 based on the occurrence of the triggering event.

Block 806 illustrates determining whether the payment reader device is in the predetermined power state. The event module 150 may determine whether the payment reader device 110 is in the predetermined power state. In some examples, the event module 150 may send a request to the payment reader device 110 to determine the current power state of the payment reader device 110. In such examples, the event module 150 may ping the payment reader device 110 to determine whether it responds. If the payment reader device 110 does not respond, the event module 150 may determine that the payment reader device 110 is in an off state. Or, if the payment reader device 110 responds, the event module 150 may determine that the payment reader device 110 is in a high-power state or a low-power state. In at least one example, the event module 150 may utilize the amount of time that the payment reader device 110 takes to respond to determine whether the payment reader device 110 is in a high-power state or a low-power state. That is, if the payment reader device 110 is in a low-power state, the payment reader device 110 may take longer to respond than if the payment reader device 110 is in a high-power state. The event module 150 may compare the current power state of the payment reader device 110 with the predetermined power state to determine whether the current power state matches the predetermined power state. Based at least in part on determining that the payment reader device 110 is in the predetermined power state, the event module 150 may not send a signal to the payment reader device 110, as shown in block 808. Based at least in part on determining that the payment reader device 110 is in a power state other than the predetermined power state, the event module 150 may send a signal to the payment reader device 110 instructing the payment reader device 110 to change to the predetermined power state, as shown in block 810.

Block 812 illustrates receiving the signal from the POS terminal. The execution module 172 associated with the payment reader device 110 may receive a signal from the event module 150. The signal may indicate the predetermined power state (e.g., high-power state, low-power state, off state, etc.).

Block 814 illustrates executing the change to the predetermined power state. The execution module 172 may modify the power state of the payment reader device 110 so that it is in the predetermined power state. For instance, if the payment reader device 110 is in a low-power state, and the signal indicates that the payment reader device 110 is to be in a high-power state, the execution module 172 may provide instructions for the reader chip 160 to power up the payment reader device 110 to a high-power state. Or, if the payment reader device 110 is in a high-power state, and the signal indicates that the payment reader device 110 is to be in a low-power state, the execution module 172 may provide instructions for the reader chip 160 to power down the payment reader device 110 to a low-power state.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system for registering a time-out schedule on a battery-operated payment reader device in a point-of-sale (POS) system of a merchant that has not previously registered with a payment service, the payment service processing transactions between merchants and customers using payment data received from respective battery-operated payment reader devices of the merchants, the system comprising:

the battery-operated payment reader device wirelessly coupled to a POS terminal of the POS system, the battery-operated payment reader device being associated with a useful duration of battery charge available for use by the merchant;

a POS application stored on the POS terminal, the POS application comprising instructions to communicate with the battery-operated payment reader device and a server associated with the payment service; and a server-side application stored on the server, the server-side application being associated with the payment service and comprising instructions to:

receive, from the POS application, a request to register the merchant with the payment service, the request including merchant information corresponding to at least one of a geographic location of the merchant, an item offered for acquisition by the merchant, or a category associated with the merchant;

determine a classification associated with the merchant, the classification representative of at least one of the geographic location of the merchant, the item offered for acquisition by the merchant, or the category associated with the merchant;

determine a group of merchants having previously registered with the payment service, each of the merchants in the group of merchants being associated with the classification;

analyze first transaction data associated with previous transactions involving the group of merchants;

determine, based at least in part on the first transaction data, a time-out schedule for powering down the battery-operated reader device, the time-out schedule causing the battery-operated payment reader device to change from a high-power state to a low-power state at a time when transactions with the merchant are not predicted to occur; and send the time-out schedule to the POS application;

wherein the POS application further comprises instructions to receive the time-out schedule from the server-side application and send the time-out schedule to the battery-operated payment reader device; and wherein the battery-operated payment reader device comprises instructions to receive the time-out schedule from the POS application and change from the high-power state to the low-power state based at least in part on the time-out schedule.

2. The system of claim 1, the server-side application further comprising instructions to:

determine, based at least in part on second transaction data associated with the merchant, at least one of a frequency of transactions involving the merchant, a frequency of using a payment method, a pattern of transactions involving the merchant, or a pattern of using a payment method;

modify the time-out schedule based at least in part on at least one of the frequency of the transactions involving the merchant, the frequency of using the payment method, the pattern of transactions involving the merchant, or the pattern of using the payment method to generate a modified time-out schedule; and send the modified time-out schedule to the POS application.

3. The system of claim 1, the POS application further comprising instructions to:

determine that a customer is within a predetermined distance of the POS terminal or the battery-operated payment reader device; and send a signal to the battery-operated payment reader device to cause the battery-operated reader device to change to the high-power state.

4. The system of claim 1, the POS application further comprising instructions to:

determine login activity of the merchant; and send a signal to the battery-operated reader device to cause the battery-operated payment reader device to change to the high-power state.

5. A computer-implemented method for managing power states of a battery-operated payment reader device that wirelessly couples to a point-of-sale (POS) terminal of a first POS system of a first merchant, the computer-implemented method comprising:

receiving, at a server-side application, transaction data from the first POS system, the transaction data being associated with transactions involving the first merchant;

determining, by the server-side application and based at least in part on the transaction data, a schedule for managing the power states of the battery-operated payment reader device, the schedule indicating when to change a first state of the battery-operated payment reader device to a second state;

sending, from the server-side application, the schedule to the first POS system;

receiving, at a POS application of the first POS system, the schedule from the server-side application; and transmitting, by the POS application and to the battery-operated payment reader device, an indication to change to the second power state based on the schedule.

6. The computer-implemented method of claim 5, further comprising:

determining, based at least in part on the transaction data, at least one of a frequency of transactions involving the first merchant, a frequency of using a payment method, a pattern of transactions involving the first merchant, or a pattern of using a payment method; and determining the schedule based at least in part on at least one of the frequency of transactions involving the first merchant, the frequency of using the payment method, the pattern of transactions involving the first merchant, or the pattern of using the payment method.

7. The computer-implemented method of claim 5, further comprising:

receiving, from a second POS system associated with a second merchant that has not previously utilized a payment service, a request to register with the payment service;

determining a similarity score between the first merchant and the second merchant;

determining that the similarity score is above a threshold score; and sending the schedule to the second POS application for altering power states of a component of the second POS system.

8. The computer-implemented method of claim 5, wherein the first state comprises a low-power state and the second state comprises a high-power state or an off state.

9. The computer-implemented method of claim 5, wherein the first state comprises a high-power state and the second state comprises a low-power state or an off state.

10. The computer-implemented method of claim 5, wherein the first state comprises a high-power state or a low-power state and the second state comprises an off state.

11. The computer-implemented method of claim 5, wherein altering the power states of the battery-operated payment reader device based on the schedule comprises causing the battery-operated payment reader device to change from the first state to the second state while maintaining a power state of the POS terminal.

12. A system comprising:

a point-of-sale (POS) terminal of a merchant, the POS terminal comprising an application associated with first instructions that program one or more first processors to perform first actions comprising:

determining transaction data associated with transactions between the merchant and one or more customers;

sending the transaction data to servers associated with a payment service;

receiving, from the payment service, schedule information that is based at least in part on the transaction data; and sending the schedule information to a battery-operated payment reader device that couples to the POS terminal; and the battery-operated payment reader device comprising: one or more second processors; and one or more non-transitory computer-readable media storing second instructions executable by the one or more second processors, wherein the second instructions program the one or more processors to perform second actions comprising:

receiving the schedule information from the application; and altering power states of the battery-operated payment reader based at least in part on the schedule information.

13. The system of claim 12, wherein:

the schedule information is associated with instructions directing the battery-operated payment reader device to power down a predetermined amount of time after an interaction with the battery-operated payment reader device; and altering the power states of the battery-operated payment reader comprises:

determining the interaction with the battery-operated payment reader device;

determining a lapse of an amount of time that is equal to the predetermined amount of time; and changing a power state of the battery-operated payment reader device from a high-power state to a low-power state or an off state.

14. The system of claim 12, wherein:

the schedule information is associated with instructions directing the battery-operated payment reader device to power up a predetermined amount of time after the battery-operated payment reader device powers down; and altering the power states of the battery-operated payment reader comprises:

determining that the battery-operated payment reader device changes from a high-power state to a low-power state;

determining a lapse of an amount of time that is equal to the predetermined amount of time; and changing a power state of the battery-operated payment reader device from the low-power state to the high-power state.

15. The system of claim 12, wherein:

the schedule information indicates a time when the battery-operated payment reader device is to be in a predetermined power state; and altering the power states of the battery-operated payment reader device comprises:

determining an occurrence of the time;

determining that the battery-operated payment reader device is not in the predetermined power state; and changing a power state of the battery-operated payment reader device to the predetermined power state.

16. The system of claim 12, wherein:

the first actions further comprise:

determining an occurrence of a triggering event; and sending, based at least in part on determining the occurrence of the triggering event, a signal to the battery-operated payment reader device; and the second actions further comprise:

receiving the signal, the signal effectuating a change to a predetermined power state; and changing a power state of the battery-operated payment reader device to the predetermined power state.

17. The system of claim 12, the second actions further comprising:

receiving, from the application, updated schedule information; and altering the power states of the battery-operated payment reader based at least in part on the updated schedule information.

18. The system of claim 17, wherein:

the schedule information comprises a first portion of the schedule associated with instructions directing the battery-operated payment reader device to change power states a first predetermined amount of time after a first event; and the updated schedule information comprises a second portion of the schedule associated with instructions directing the battery-operated payment reader device to change power states a second predetermined amount of time after a second event.

19. The system of claim 17, wherein:

the schedule information comprises the schedule; and
the updated schedule information comprises a new schedule.

20. The system of claim 12, wherein the battery-operated payment reader device further comprises a network interface to enable the battery-operated payment reader device to send payment data to the application via Bluetooth®, Bluetooth® low energy, near-field communication, or radio frequency identification.

* * * * *